(12) United States Patent
Ito et al.

(10) Patent No.: US 11,907,472 B2
(45) Date of Patent: Feb. 20, 2024

(54) DETECTION DEVICE AND DISPLAY UNIT

(71) Applicant: Shanghai Tianma Micro-Electronics Co., Ltd., Shanghai (CN)

(72) Inventors: Yuki Ito, Kanagawa (JP); Yukihiro Ito, Kanagawa (JP)

(73) Assignee: Shanghai Tianma Micro-Electronics Co., Ltd., Shanghai (CN)

(*) Notice: Subject to any disclaimer, the term of this patent is extended or adjusted under 35 U.S.C. 154(b) by 0 days.

(21) Appl. No.: 17/555,893

(22) Filed: Dec. 20, 2021

(65) Prior Publication Data

US 2022/0206657 A1 Jun. 30, 2022

(30) Foreign Application Priority Data

Dec. 24, 2020 (JP) ................................ 2020-215059

(51) Int. Cl.
*G06F 3/041* (2006.01)
*H04N 13/302* (2018.01)
*G06F 3/044* (2006.01)
*G06F 3/04883* (2022.01)

(52) U.S. Cl.
CPC ........ *G06F 3/04166* (2019.05); *G06F 3/0446* (2019.05); *H04N 13/302* (2018.05); *G06F 3/04883* (2013.01)

(58) Field of Classification Search
CPC . H04N 13/302; G06F 3/04166; G06F 3/0446; G06F 3/04883; G06F 3/017; G06F 2203/04111; G06F 2203/04112; G06F 3/044; G06F 2203/04108
See application file for complete search history.

(56) References Cited

U.S. PATENT DOCUMENTS

| 2015/0002448 A1* | 1/2015 | Brunet | G06F 3/0418 345/174 |
| 2015/0168761 A1* | 6/2015 | Chang | G02B 30/27 349/12 |
| 2015/0248180 A1* | 9/2015 | Wakuda | G06F 3/0446 200/600 |
| 2016/0313852 A1 | 10/2016 | Dorfner | |

FOREIGN PATENT DOCUMENTS

JP 2018-515837 A 6/2018

* cited by examiner

*Primary Examiner* — Robin J Mishler
(74) *Attorney, Agent, or Firm* — Sughrue Mion, PLLC

(57) ABSTRACT

A detection device includes a plurality of first electrodes extending in a first direction, a plurality of second electrodes extending in a second direction that crosses the first direction, and a controller. The controller selects, as first detection electrodes, two of the first electrodes and two of the second electrodes positioned outermost in a predetermined detection region, selects, as first driving electrodes, at least one of first electrodes and the second electrodes not selected as the first detection electrodes, and detects a target in a non-contacting state from signals expressing capacitances acquired, by applying a voltage to the first driving electrodes, from the first detection electrodes.

9 Claims, 18 Drawing Sheets

DETECTION DEVICE AND DISPLAY UNIT

CROSS-REFERENCE TO RELATED APPLICATION

This application claims the benefit of Japanese Patent Application No. 2020-215059, filed on Dec. 24, 2020, the entire disclosure of which is incorporated by reference herein.

FIELD

This application relates generally to a detection device and a display unit.

BACKGROUND

In the related art, there are interfaces that are provided on display panels that display text, images, and the like. However, there is a need for an interface that receives user commands by user gestures. For example, Unexamined Japanese Patent Application Publication (Translation of PCT Application) No. 2018-515837 describes a display module that includes transmission electrodes arranged in a display region of a display, and receiver electrodes that are arranged on the periphery of the display region of the display and that surround the transmission electrode. In Unexamined Japanese Patent Application Publication (Translation of PCT Application) No. 2018-515837, the capacitance between the transmission electrodes and the receiver electrodes is measured to detect a gesture performed by a hand or a finger in detection space.

With the display module of Unexamined Japanese Patent Application Publication (Translation of PCT Application) No. 2018-515837, the receiver electrodes are arranged on the periphery of the display region of the display and, as such, the width of the frame increases. Additionally, in large displays, spacing between the receiver electrodes is wide, which makes it difficult to detect small gestures.

SUMMARY

A detection device according to a first aspect of the present disclosure includes:
a plurality of first electrodes extending in a first direction;
a plurality of second electrodes extending in a second direction that crosses the first direction; and
a controller that selects, as first detection electrodes, two of the first electrodes and two of the second electrodes positioned outermost in a predetermined detection region, selects, as first driving electrodes, at least one of first electrodes and the second electrodes not selected as the first detection electrodes, and detects a target in a non-contacting state from signals expressing capacitances acquired, by applying a voltage to the first driving electrodes, from the first detection electrodes.

A display unit according to a second aspect of the present disclosure includes:
the detection device described above; and
a display device.

It is to be understood that both the foregoing general description and the following detailed description are exemplary and explanatory and are not restrictive of this disclosure.

BRIEF DESCRIPTION OF THE DRAWINGS

A more complete understanding of this application can be obtained when the following detailed description is considered in conjunction with the following drawings, in which.

DETAILED DESCRIPTION

Hereinafter, a detection device according to various embodiments is described while referencing the drawings.

Embodiment 1

A detection device 10 according to the present embodiment is described while referencing FIGS. 1 to 12. The detection device 10 detects a target (for example, a gesture of a user) in a non-contacting state. Additionally, the detection device 10 also functions as a touch panel by detecting a position that the target (for example, a finger of the user) contacts. Firstly, the overall configuration of the detection device 10 is described.

Figure 1:
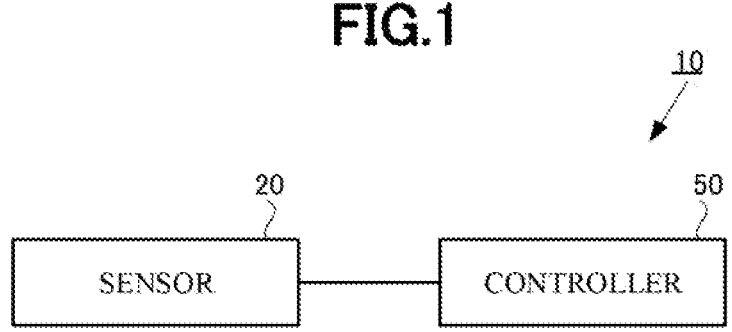
FIG. 1 is a drawing illustrating a detection device according to Embodiment 1.
Figure 2:
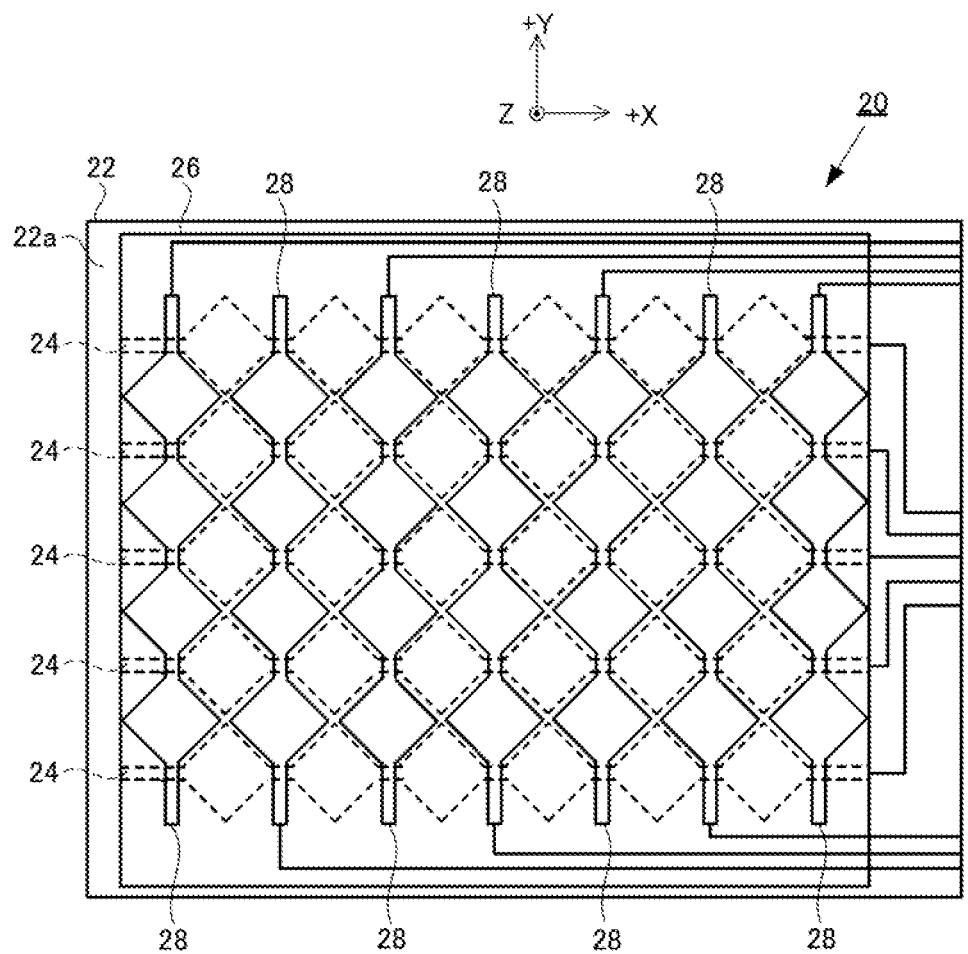
FIG. 2 is a plan view illustrating a sensor according to Embodiment 1.

As illustrated in FIG. 1, the detection device 10 includes a sensor 20 and a controller 50. As illustrated in FIG. 2, the sensor 20 includes a light transmitting substrate 22, a plurality of first electrodes 24, a plurality of second electrodes 28, and the like. The plurality of first electrodes 24 and the plurality of second electrodes 28 are formed on the light transmitting substrate 22. The controller 50 controls voltage that is applied to the first electrodes 24 and the second electrodes 28. Additionally, the controller 50 detects the target from signals expressing the capacitance of the first electrodes 24 and the second electrodes 28. In the present embodiment, to facilitate comprehension, a description is given in which, in FIG. 2, the right direction (the right direction on paper) of the detection device 10 is referred to as the "+X direction", the up direction (the up direction on paper) is referred to as the "+Y direction", and the direction perpendicular to the +X direction and the +Y direction (the front direction on paper) is referred to as the "+Z direction."

Figure 3:
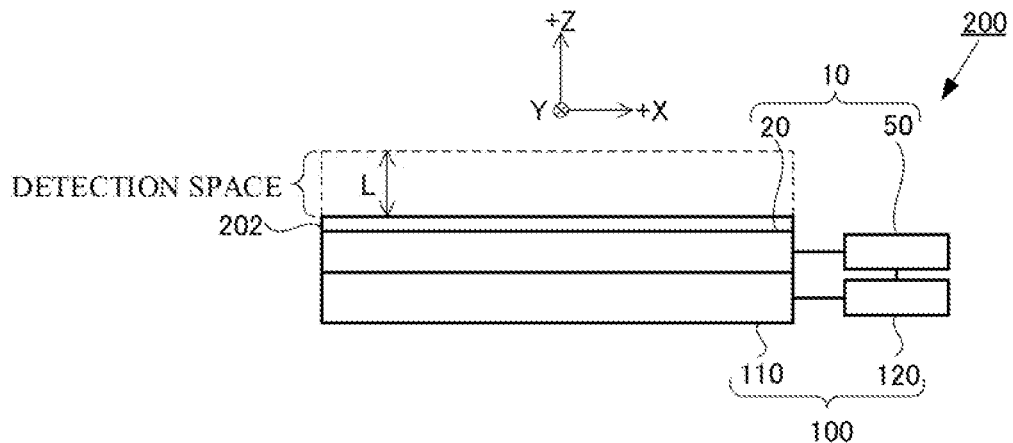
FIG. 3 is a schematic drawing illustrating a display unit according to Embodiment 1.

As illustrated in FIG. 3, the detection device 10 and a display device 100 constitute a display unit 200. The display unit 200 is mounted in a smartphone, a laptop computer, an information display, or the like. The display device 100 includes a display panel 110 and a display controller 120. The display panel 110 displays two-dimensional text, images, and the like. The display panel 110 is implemented as a liquid crystal display panel, an organic electro-luminescence (EL) display panel, or the like. The display controller 120 controls the displaying of the display panel 110. The display controller 120 and the controller 50 of the detection device 10 are connected to each other.

The sensor 20 of the detection device 10 is provided on the display surface side of the display panel 110 via a non-illustrated adhesive layer. In this case, the first electrodes 24 and the second electrodes 28 of the sensor 20 are positioned on a display region of the display panel 110. Additionally, a protective cover 202 made from resin is provided on the sensor 20 via a non-illustrated adhesive layer. The detection device 10 detects the target in a non-contacting state that is positioned in the detection space of the sensor 20. Moreover, the detection device 10 detects the position at which a target contacts the sensor 20 (the protective cover 202). As a result, the detection device 10 functions as an interface that receives user commands for the displaying of the display device 100. Note that, in one example, a thickness L of the detection space is 150 mm.

Next, the specific configuration of the detection device 10 is described. As illustrated in FIG. 2, the sensor 20 of the detection device 10 includes the light transmitting substrate 22, the plurality of first electrodes 24, an insulating layer 26, and the plurality of second electrodes 28.

In one example, the light transmitting substrate 22 of the sensor 20 is implemented as a glass substrate. The light transmitting substrate 22 includes a first main surface 22a.

Each of the first electrodes 24 of the sensor 20 is provided on the first main surface 22a of the light transmitting substrate 22. The first electrodes 24 extend in a first direction (the X direction in the present embodiment). The first electrodes 24 are arranged at equal spacings in the Y direction. The first electrodes 24 have a pattern in which corners of a plurality of rectangles are connected in a line (a so-called "diamond pattern"). Each of the first electrodes 24 is electrically connected to the controller 50 via a non-illustrated wiring.

The insulating layer 26 of the sensor 20 is provided on the first electrodes 24, and insulates the first electrodes 24 and the second electrodes 28 from each other. In one example, the insulating layer 26 is implemented as a silicon oxide thin film.

Each of the second electrodes 28 of the sensor 20 are provided on the insulating layer 26. The second electrodes 28 extend in a second direction (the Y direction in the present embodiment) that crosses the first direction. As with the first electrodes 24, the second electrodes 28 have a pattern in which corners of a plurality of rectangles are connected in a line. Each of the second electrodes 28 is electrically connected to the controller 50 via a non-illustrated wiring.

In one example, the first electrodes 24 and the second electrodes 28 are formed from indium tin oxide (ITO). When viewing the sensor 20 from above, the first electrodes 24 and the second electrodes 28 cross at connections where the corners of the rectangles connect. The first electrodes 24 and the second electrodes 28 form capacitance with the target (for example, a finger, a hand, a pen, or the like of a user). Note that, the first electrodes 24 and the second electrodes 28 may be implemented as metal mesh electrodes.

The controller 50 of the detection device 10 detects, from signals expressing the capacitances of the first electrodes 24 and the second electrodes 28, the target in a non-contacting state that is positioned in the detection space on the sensor 20. Additionally, the detection device 10 detects, from signals expressing the capacitances of the first electrodes 24 and the second electrodes 28, a position that the target contacts. In the present embodiment, two detection modes, namely detection of the target in a non-contacting state (hereinafter referred to as "non-contact mode") and detection of the position that the target contacts (hereinafter referred to as "contact mode"), are switched between in time divisions.

Figure 4:
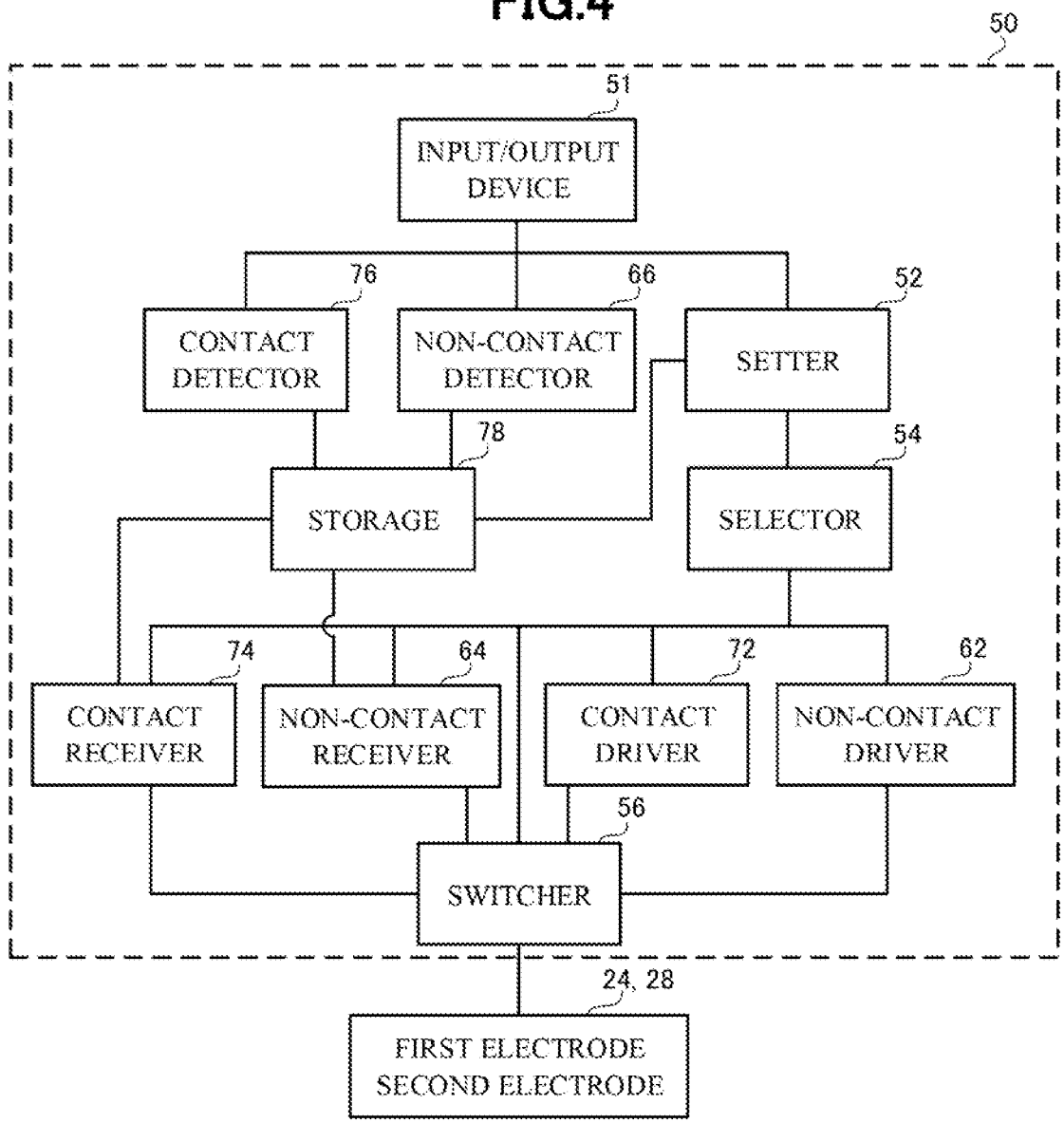
FIG. 4 is a block diagram illustrating the configuration of a controller according to Embodiment 1.

Firstly, the functional configuration of the controller 50 is described. As illustrated in FIG. 4, the controller 50 includes an input/output device 51, a setter 52, a selector 54, and a switcher 56. Furthermore, the controller 50 includes a non-contact driver 62, a non-contact receiver 64, a non-contact detector 66, a contact driver 72, a contact receiver 74, a contact detector 76, and a storage 78.

The input/output device 51 of the controller 50 inputs and outputs signals to and from the setter 52 and the display controller 120 of the display device 100, signals to and from the non-contact detector 66 and a controller of an electronic apparatus on which the detection device 10 is mounted, and the like.

Figure 5:
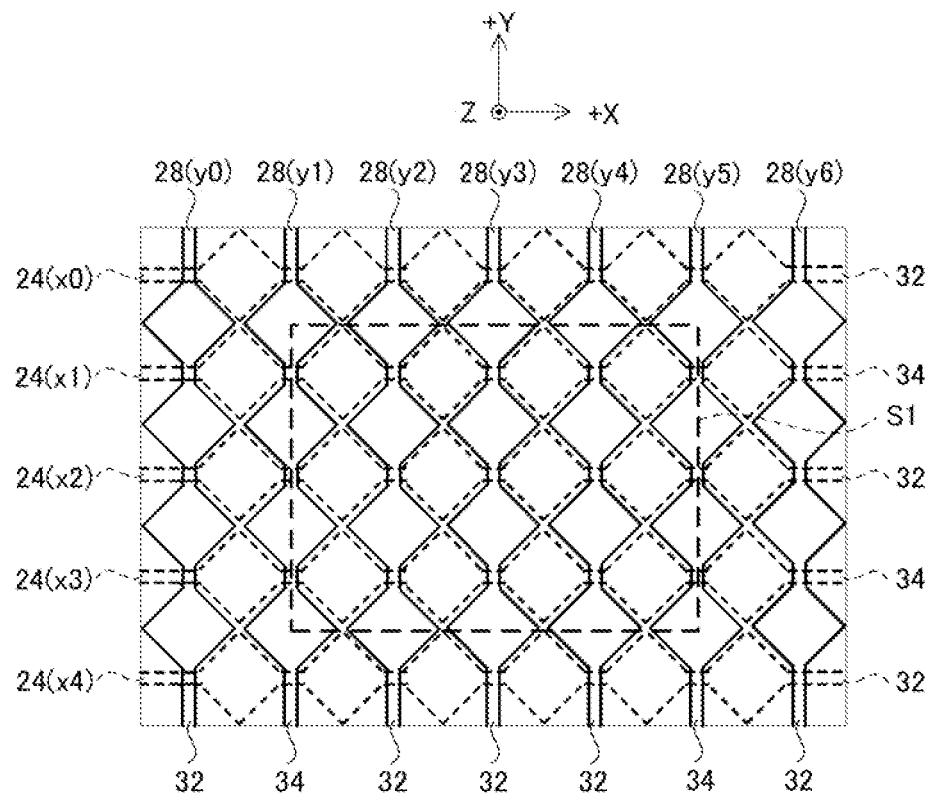
FIG. 5 is a drawing illustrating a first detection region, first driving electrodes, and first detection electrodes according to Embodiment 1.

The setter 52 of the controller 50 sequentially switches between the non-contact mode and the contact mode in time divisions, and sets the detection mode to the non-contact mode or the contact mode. Additionally, when the non-contact mode is set as the detection mode, as illustrated in FIG. 5, the setter 52 sets, to the sensor 20, a predetermined first detection region S1 that detects the target in the non-contacting state. The first detection region S1 can be optionally set in accordance with an image to be displayed on the display panel 110 of the display device 100. For example, the setter 52 receives, via the input/output device 51, data expressing an image to be displayed on the display panel 110 from the display controller 120 of the display device 100, and sets the first detection region S1 on the basis of the data expressing the image. In the non-contact mode, the target in the non-contacting state that is located in the detection space on the first detection region S1 is detected. Note that, to facilitate comprehension, the light transmitting substrate 22, the insulating layer 26, and the like are omitted from FIG. 5. Additionally, in the following, the first electrodes 24 are marked with reference numerals x0 to x4 in order from the +Y side, and the second electrodes 28 are marked with reference numerals y0 to y6 from the −X side.

Returning to FIG. 4, the selector 54 of the controller 50 selects, from among the first electrodes 24 and the second electrodes 28 and on the basis of the detection mode and the first detection region S1 set by the setter 52, first driving electrodes 32 and first detection electrodes 34, and second driving electrodes 42 and second detection electrodes 44. The first driving electrodes 32 and the first detection electrodes 34 are used in the non-contact mode. The second driving electrodes 42 and the second detection electrodes 44 are used in the contact mode. Voltage is applied to the first driving electrodes 32 and the second driving electrodes 42 from the controller 50, and signals expressing the capacitances of the first detection electrodes 34 and the second detection electrodes 44 are received by the controller 50.

When the non-contact mode is set by the setter 52, as illustrated in FIG. 5, the selector 54 selects, as the first detection electrodes 34, the two first electrodes 24(x1), 24(x3), and the two second electrodes 28(y1), 28(y5) positioned on the outermost sides of the set first detection region S1. Additionally, the selector 54 selects the first driving electrodes 32 from the first electrodes 24 and the second electrodes 28 that are not selected as the first detection electrodes 34. In the present embodiment, the selector 54 selects all of the remaining first electrodes 24 and second electrodes 28 as the first driving electrodes 32. Note that the selector 54 may select only the first electrodes 24 and the second electrodes 28 surrounding the first detection electrodes 34 as the first driving electrodes 32. Furthermore, the selector 54 may select first electrodes 24 or second electrodes 28 positioned more to the outer periphery side of the sensor 20 than the first detection electrodes 34 as the first driving electrodes 32. Ground potential may be supplied to the first electrodes 24 and the second electrodes 28 that are not selected as either the first detection electrodes 34 or the first driving electrodes 32. Additionally, the first electrodes 24 and the second electrodes 28 that are not selected as either the first detection electrodes 34 or the first driving electrodes 32 may be set as floating.

Figure 6:
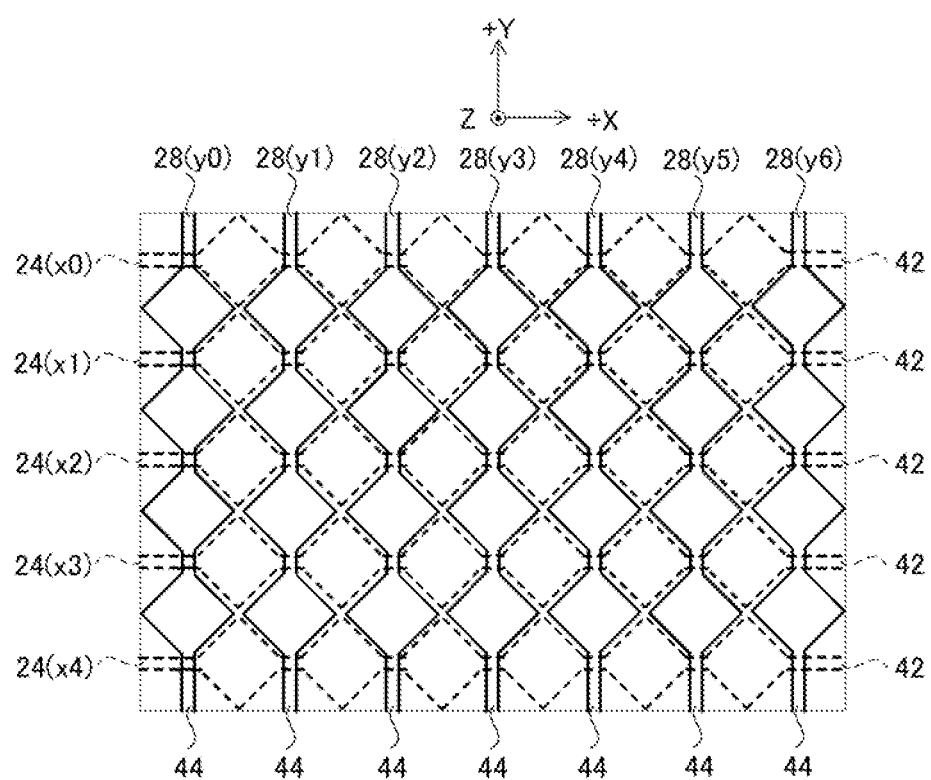
FIG. 6 is a drawing illustrating second driving electrodes and second detection electrodes according to Embodiment 1.

When the contact mode is set by the setter 52, as illustrated in FIG. 6, the selector 54 selects all of the first electrodes 24 as the second driving electrodes 42 and all of the second electrodes 28 as the second detection electrodes 44.

Returning to FIG. 4, the switcher 56 of the controller 50 switches, on the basis of the selection of the selector 54, the connection between the first electrodes 24 and the second electrodes 28, and the non-contact driver 62, the non-contact receiver 64, the contact driver 72, and the contact receiver 74.

In the non-contact mode, the switcher 56 connects the first electrodes 24(x1), 24(x3) and the second electrodes 28(y1), 28(y5) selected as the first detection electrodes 34 to the non-contact receiver 64, and connects the remaining first electrodes 24 and second electrodes 28 not selected as the first detection electrodes 34 to the non-contact driver 62. In the contact mode, the switcher 56 connects the second electrodes 28 selected as the second detection electrodes 44 to the contact receiver 74, and connects the first electrodes 24 selected as the second driving electrodes 42 to the contact driver 72.

The non-contact driver 62, the non-contact receiver 64, and the non-contact detector 66 of the controller 50 operate in the non-contact mode. The non-contact driver 62 applies voltage to the first driving electrodes 32 connected by the switcher 56. The non-contact receiver 64 receives the signals expressing the capacitances of the first detection electrodes 34 with respect to the voltage applied to the first driving electrodes 32. The non-contact detector 66 detects the target in the non-contacting state from the signals expressing the capacitances received by the non-contact receiver 64.

Figure 7:
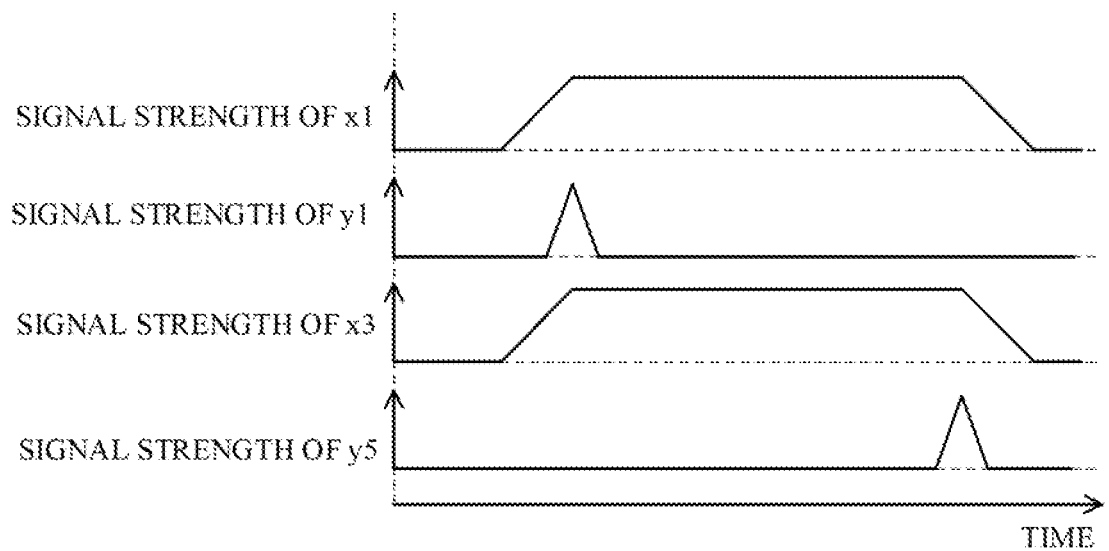
FIG. 7 is a drawing illustrating signals expressing capacitances of the first detection electrodes according to Embodiment 1.

The non-contact detector 66 detects movement (for example, a gesture of the user) of the target in the non-contacting state from changes over time in signal strength of the signals expressing the capacitances. For example, when the hand of the user crosses the detection space on the first detection region S1 from the −X direction to the +X direction, the non-contact receiver 64 receives, from the first detection electrodes 34 (specifically, the first electrodes 24(x1), 24(x3), and the second electrodes 28(y1), 28(y5)), signals expressing capacitances such as illustrated in FIG. 7. That is, in the period in which the hand of the user is crossing the first detection region S1, the non-contact receiver 64 receives signals having high strength from the first electrode 24(x1) and the first electrode 24(x3) that extend in the X direction. Additionally, in the short period in which the hand of the user crosses the second electrode 28(y1) or the second electrode 28(y5), the non-contact receiver 64 receives, from the second electrode 28(y1) and the second electrode 28(y5) that extend in the Y direction, signals having high strength in the order of the second electrode 28(y1) and the second electrode 28(y5). The non-contact detector 66 determines, on the basis of the changes over time in the signal strength, that the user has performed a flick gesture from the −X direction to the +X direction, and detects a flick gesture from the −X direction to the +X direction of the user. The non-contact detector 66 outputs, to the controller of the electronic apparatus, device, or the like on which the detection device 10 is mounted, a signal expressing the detected movement of the target in the non-contacting state. In one example, the signal expressing the movement of the target in the non-contacting state expresses a key event, a message, or the like set by the user for flick gestures in the +X direction. The signal expressing the detected movement of the target in the non-contacting state may be output one time or a plurality of times for one detection. Note that the detected gesture may be a flick gesture from the −Y direction to the +Y direction, a circle gesture in which the target in the non-contacting state moves in a circle, or the like.

Returning to FIG. 4, the contact driver 72, the contact receiver 74, and the contact detector 76 of the controller 50 operate in the contact mode. The contact driver 72 applies voltage to the second driving electrodes 42 (the first electrodes 24) connected by the switcher 56. The contact receiver 74 receives the signals expressing the capacitances from the second detection electrodes 44 (the second electrodes 28) with respect to the voltage applied to the second driving electrodes 42. The contact detector 76 detects, from the signals expressing the capacitances received by the contact receiver 74, the position that the target contacts. In one example, the contact detector 76 detects the position that the target contacts from a change in capacitance (mutual capacitance detection method in a projected capacitive touch panel). The contact detector 76 outputs, to the controller of the electronic apparatus, device, or the like on which the detection device 10 is mounted, a signal expressing the position that the target contacts.

The storage 78 of the controller 50 stores programs, data, the signals expressing the capacitances received by the non-contact receiver 64, the signals expressing the capacitances received by the contact receiver 74, and the like.

Figure 8:
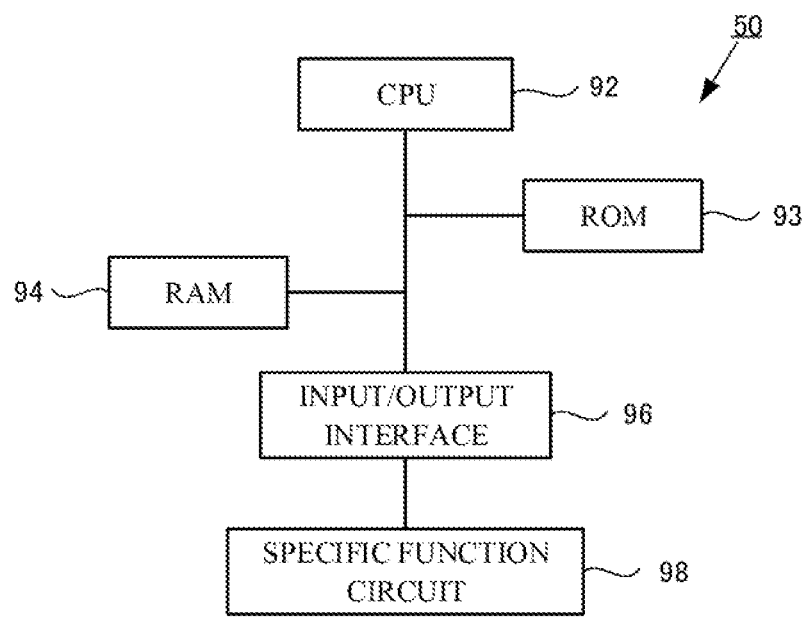
FIG. 8 is a drawing illustrating the hardware configuration of the controller according to Embodiment 1.

FIG. 8 illustrates the hardware configuration of the controller 50. The controller 50 includes a central processing unit (CPU) 92, a read-only memory (ROM) 93, a random access memory (RAM) 94, an input/output interface 96, and a specific function circuit 98. The CPU 92 executes programs stored in the ROM 93. The ROM 93 stores programs, data, signals, and the like. The RAM 94 stores data. The input/output interface 96 inputs and outputs signals between the various components. The specific function circuit 98 includes a drive circuit, a receiving circuit, a switching circuit, a calculation circuit, and the like. The functions of the controller 50 are realized by the execution of the programs by the CPU 92 and the functions of the specific function circuit 98.

Figure 9:
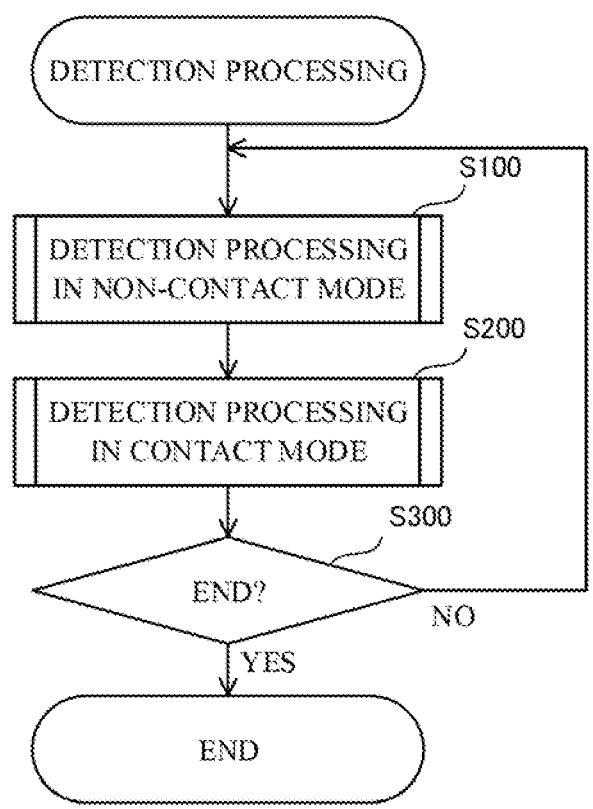
FIG. 9 is a flowchart illustrating detection processing according to Embodiment 1.

Next, detection processing (operations) of the detection device 10 is described while referencing FIGS. 9 to 12. Here, a description is given of a case in which a display unit 200 including the detection device 10 and the display device 100 is mounted on an electronic apparatus. As illustrated in FIG. 9, in the detection processing of the detection device 10, detection processing in non-contact mode is performed (step S100) and, then, detection processing in contact mode is performed (step S200). When, after the detection processing in contact mode (step S200), an end command is not inputted into the controller 50 (step S300; NO), the detection processing of the detection device 10 returns to the detection processing in non-contact mode (step S100). When an end command is inputted into the controller 50 (step S300; YES), the detection processing of the detection device 10 is ended.

Figure 10:
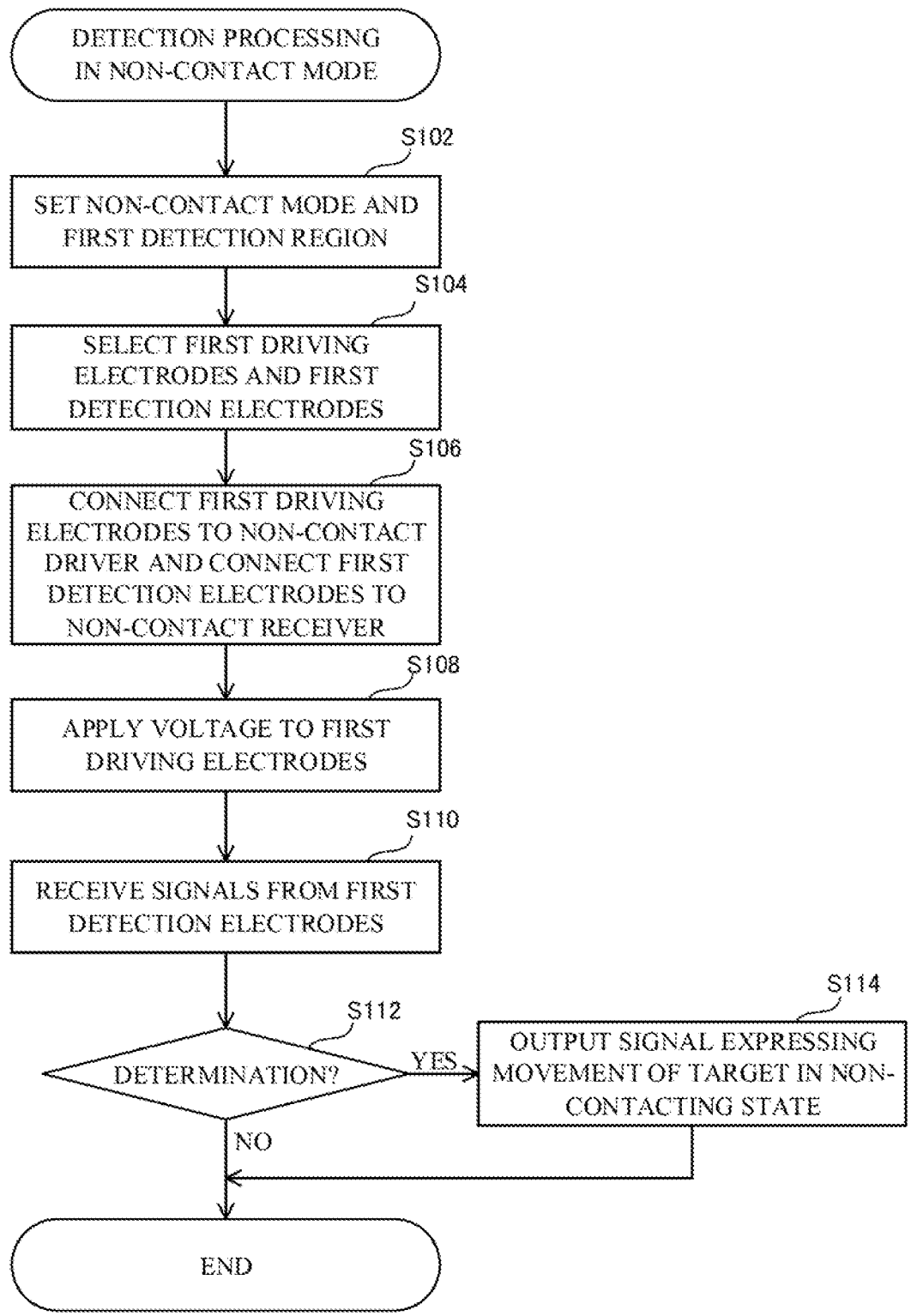
FIG. 10 is a flowchart illustrating detection processing in non-contact mode according to Embodiment 1.

Next, the detection processing in non-contact mode (step S100) is described while referencing FIG. 10. Firstly, the setter 52 of the controller 50 sets the detection mode to the non-contact mode and further sets the first detection region S1 (step S102). In one example, the first detection region S1 is set in accordance with data expressing an image to be displayed on the display panel 110. Here, the data is input via the input/output device 51.

Next, the selector 54 of the controller 50 selects, from among the first electrodes 24 and the second electrodes 28 and on the basis of the set first detection region S1, the first driving electrodes 32 and the first detection electrodes 34 (step S104). Specifically, the selector 54 selects, as the first detection electrodes 34, the two first electrodes 24($x$1, $x$3), and the two second electrodes 28($y$1, $y$5) positioned on the outermost sides of the set first detection region S1. Additionally, the selector 54 selects the remaining first electrodes 24($x$0, $x$2, $x$4) and second electrodes 28($y$0, $y$2 to $y$4, $y$6) as the first driving electrodes 32.

Figure 11:
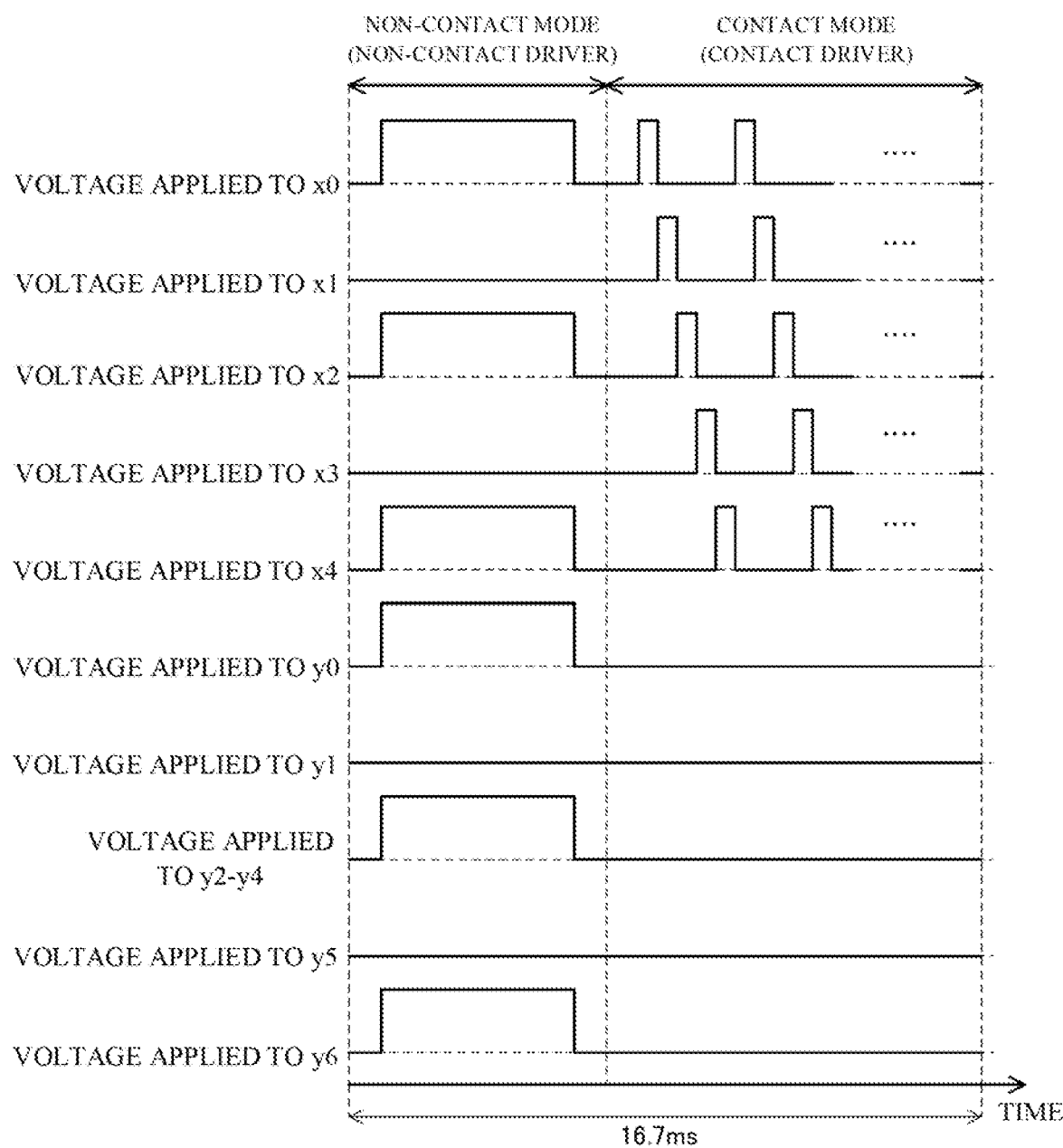
FIG. 11 is a schematic drawing illustrating voltage that is applied to the first driving electrodes and the second driving electrodes according to Embodiment 1.

Next, the switcher 56 of the controller 50 connects the selected first driving electrodes 32 to the non-contact driver 62 of the controller 50, and connects the selected first detection electrodes 34 to the non-contact receiver 64 of the controller 50 (step S106). Then, the non-contact driver 62 applies voltage to the first driving electrodes 32 (step S108), and the non-contact receiver 64 receives the signals expressing the capacitances of the first detection electrodes 34 (step S110). Specifically, as illustrated in FIG. 11, the non-contact driver 62 applies voltage of a predetermined pulse width to the first electrodes 24($x$0, $x$2, $x$4) and second electrodes 28($y$0, $y$2 to $y$4, $y$6). In one example, the non-contact receiver 64 receives signals expressing capacitances such as illustrated in FIG. 7. The signals expressing the capacitances received by the non-contact receiver 64 are stored in the storage 78.

Returning to FIG. 10, the non-contact detector 66 of the controller 50 determines the movement (gesture of the user) of the target in the non-contacting state from the changes over time in the signal strength of the signals expressing the capacitances, received by the non-contact receiver 64 (step S112). This determination is carried out on the basis of a specific algorithm, deep learning, or the like from the changes over time in the signal strength of the signals stored in the storage 78. Additionally, it is preferable that this determination is carried out from the changes over time in the signal strength of the signals expressing the capacitances of at least three of the first detection electrodes 34. As a result, detections outside the first detection region S1 can be prevented. When a determination is made that the changes over time in the signal strength express movement of the target in the non-contacting state, and movement of the target in the non-contacting state is detected (step S112; YES), the non-contact detector 66 outputs, to the controller of the electronic apparatus on which the display unit 200 (the detection device 10) is mounted and via the input/output device 51, a signal expressing the detected movement of the target in the non-contacting state (step S114). When the non-contact detector 66 outputs the signal expressing the movement of the target in the non-contacting state, the detection processing in non-contact mode (step S100) is ended. Note that, a configuration is possible in which the non-contact detector 66 first determines the movement of the target in the non-contacting state from changes over time in the signal strength of the signals expressing the capacitances of one or two of the first detection electrodes 34 and, then, re-determines the movement of the target in the non-contacting state from changes over time in the signal strength of the signals expressing the capacitances of at least three of the first detection electrodes 34.

When a determination is not made that the changes over time in the signal strength express movement of the target in the non-contacting state, and movement of the target in the non-contacting state is not detected (step S112; NO), the detection processing in non-contact mode (step S100) is ended.

Figure 12:
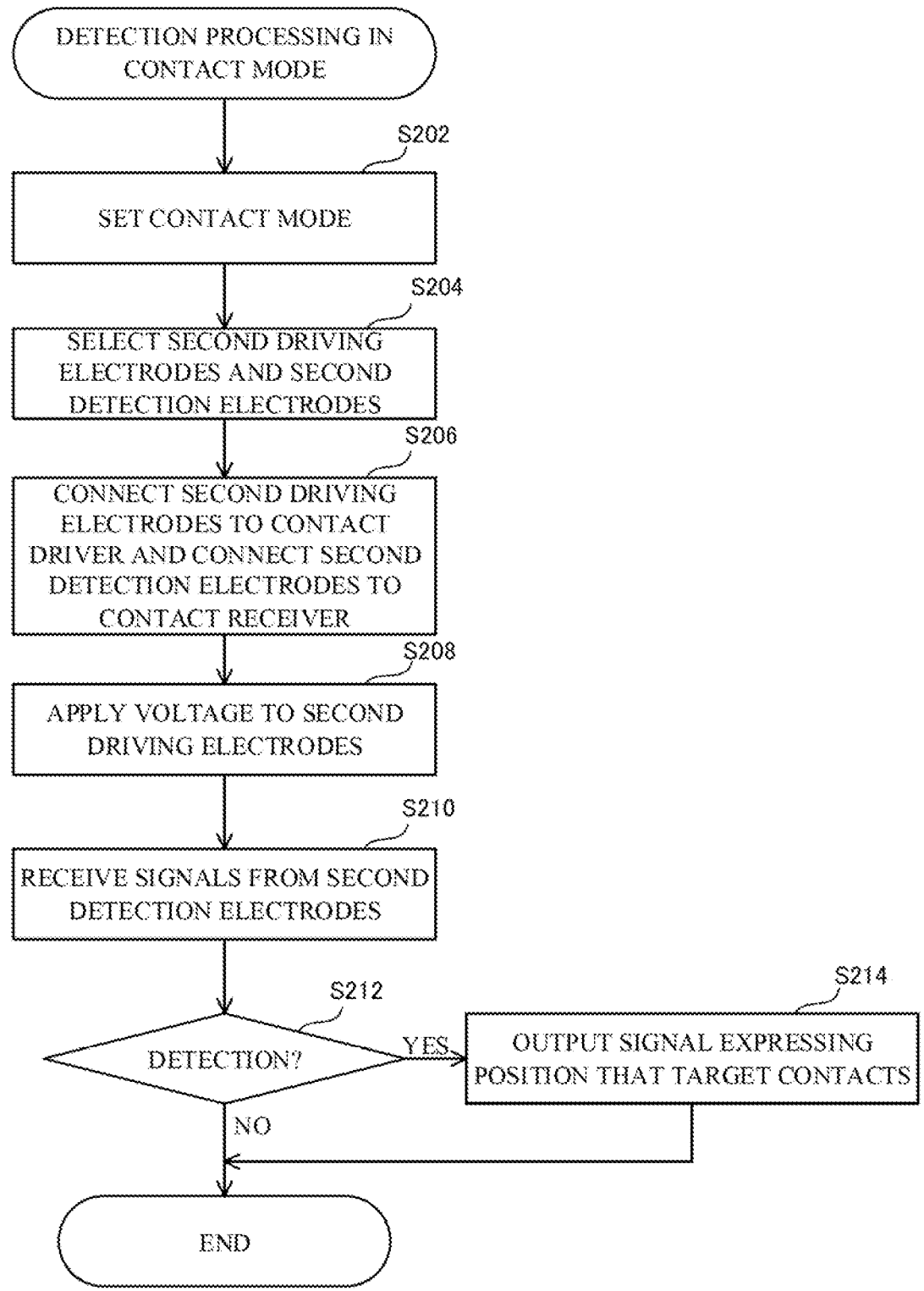
FIG. 12 is a flowchart illustrating detection processing in contact mode according to Embodiment 1.

Next, the detection processing in contact mode (step S200) is described while referencing FIG. 12. Firstly, the setter 52 of the controller 50 sets the detection mode to the contact mode (step S202). Next, the selector 54 of the controller 50 selects, from among the first electrodes 24 and the second electrodes 28, the second driving electrodes 42 and the second detection electrodes 44 (step S204). Specifically, the selector 54 selects all of the first electrodes 24 as the second driving electrodes 42 and selects all of the second electrodes 28 as the second detection electrodes 44.

The switcher 56 of the controller 50 connects the selected second driving electrodes 42 to the contact driver 72 of the controller 50, and connects the selected second detection electrodes 44 to the contact receiver 74 of the controller 50 (step S206). Then, the contact driver 72 applies voltage to the second driving electrodes 42 (step S208), and the contact receiver 74 receives the signals expressing the capacitances of the second detection electrodes 44 (step S210). As illustrated in FIG. 11, the contact driver 72 repeatedly applies voltage of a predetermined pulse width sequentially to the first electrodes 24($x$0) to 24($x$4). Note that the contact driver 72 may apply the voltage of the predetermined pulse width to each of the first electrodes 24(x0) to 24(x4) one at a time.

The contact detector 76 of the controller 50 detects, by mutual capacitance detection, the position that the target contacts from the signals expressing the capacitances received by the second detection electrodes 44 (step S212). When the contact detector 76 detects a position that the target contacts (step S212; YES), the contact detector 76 outputs, to the controller of the electronic apparatus on which the display unit 200 (the detection device 10) is mounted and via the input/output device 51, a signal expressing the position that the target contacts (step S214). When the contact detector 76 outputs the signal expressing the position that the target contacts, the detection processing in contact mode (step S200) is ended.

When the contact detector 76 does not detect a position that the target contacts (step S212; NO), the detection processing in contact mode (step S200) is ended.

As described above, the movement of the target in the non-contacting state can be detected by the first electrodes 24 and the second electrodes 28 of the sensor 20 positioned on the display region of the display panel 110. As such, the frame of the detection device 10 can be narrowed. Furthermore, the first detection region 51 that detects the movement of the target in the non-contacting state can be optionally set and, as such, the movement of the target in the non-contacting state can be detected with high sensitivity, regardless of the size of the display panel 110. Moreover, the detection device 10 can also function as a touch panel.

Embodiment 2

In the detection in non-contact mode of Embodiment 1, the detection device 10 applies voltage at once to the first driving electrodes 32, and receives a signal from each of the four first detection electrodes 34 at once. A configuration is possible in which, in the detection in non-contact mode, the detection device 10 drives the first driving electrodes 32 and the first detection electrodes 34 in time divisions.

In the present embodiment, the configuration of the controller 50 in the non-contact mode and the detection processing in non-contact mode differ from Embodiment 1. The other configurations and processings of the detection device 10 are the same as with the detection device 10 of Embodiment 1.

In the non-contact mode, the controller 50 of the present embodiment drives the first driving electrodes 32 and the first detection electrodes 34 in time divisions. Specifically, the controller 50 of the present embodiment receives signals expressing the capacitances from two of the first detection electrodes 34, then receives signals expressing the capacitances from two others of the first detection electrodes 34, and detects the target in the non-contacting state from the signals expressing the capacitances of the four first detection electrodes 34.

As with the controller 50 of Embodiment 1, the controller 50 of the present embodiment includes the input/output device 51, the setter 52, the selector 54, the switcher 56, the non-contact driver 62, the non-contact receiver 64, the non-contact detector 66, the contact driver 72, the contact receiver 74, the contact detector 76, and the storage 78. The configurations of the input/output device 51, the contact driver 72, the contact receiver 74, the contact detector 76, and the storage 78 are the same as in Embodiment 1.

As with the setter 52 of Embodiment 1, the setter 52 of the present embodiment sets the detection mode to the non-contact mode. When the non-contact mode is set as the detection mode, the setter 52 of the present embodiment sets, to the sensor 20, the predetermined first detection region 51 that detects the target in the non-contact mode.

As in Embodiment 1, the selector 54 of the present embodiment selects, from among the first electrodes 24 and the second electrodes 28 and on the basis of the detection mode and the first detection region S1 set by the setter 52, the first driving electrodes 32 and the first detection electrodes 34, and the second driving electrodes 42 and the second detection electrodes 44. When the contact mode is set by the setter 52, as in Embodiment 1, the selector 54 of the present embodiment selects all of the first electrodes 24 as the second driving electrodes 42 and all of the second electrodes 28 as the second detection electrodes 44.

Figure 13:
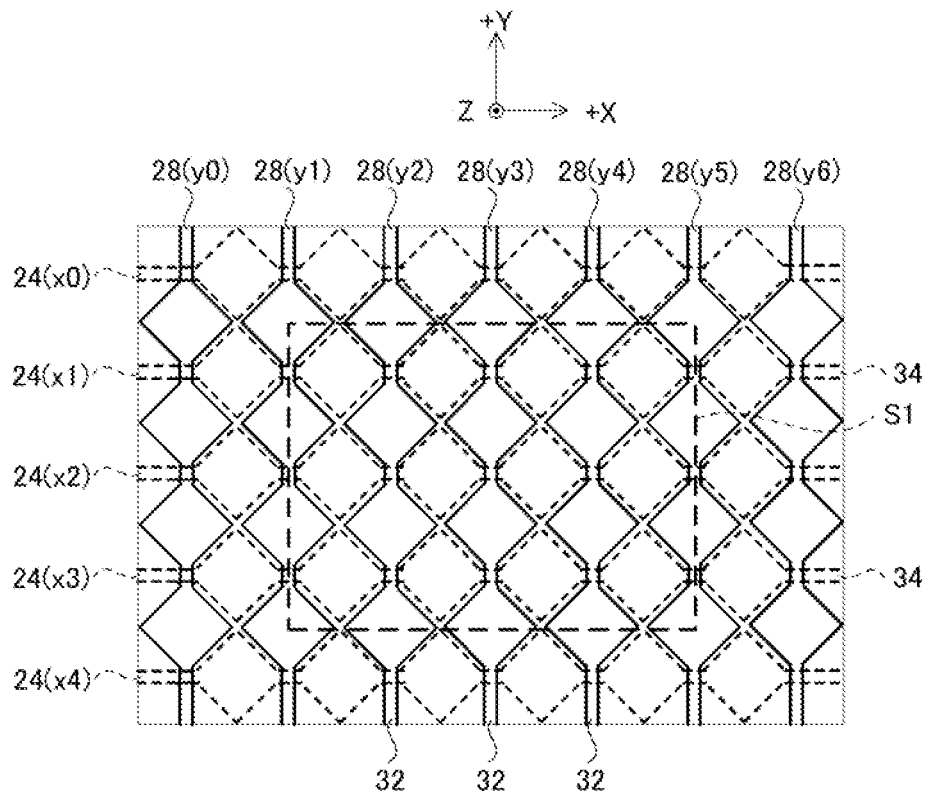
FIG. 13 is a drawing illustrating a first detection region, first driving electrodes, and first detection electrodes according to Embodiment 2.

When the non-contact mode is set by the setter 52, as illustrated in FIG. 13, the selector 54 of the present embodiment selects, from among the first electrodes 24, the two first electrodes 24(x1), 24(x3) positioned on the outermost side of the first detection region S1 as the first detection electrodes 34. Additionally, the selector 54 of the present embodiment selects, as the first driving electrodes 32, the second electrodes 28(y2 to y4) that intersect the first electrodes 24(x1), 24(x3) selected as the first detection electrodes 34.

Figure 14:
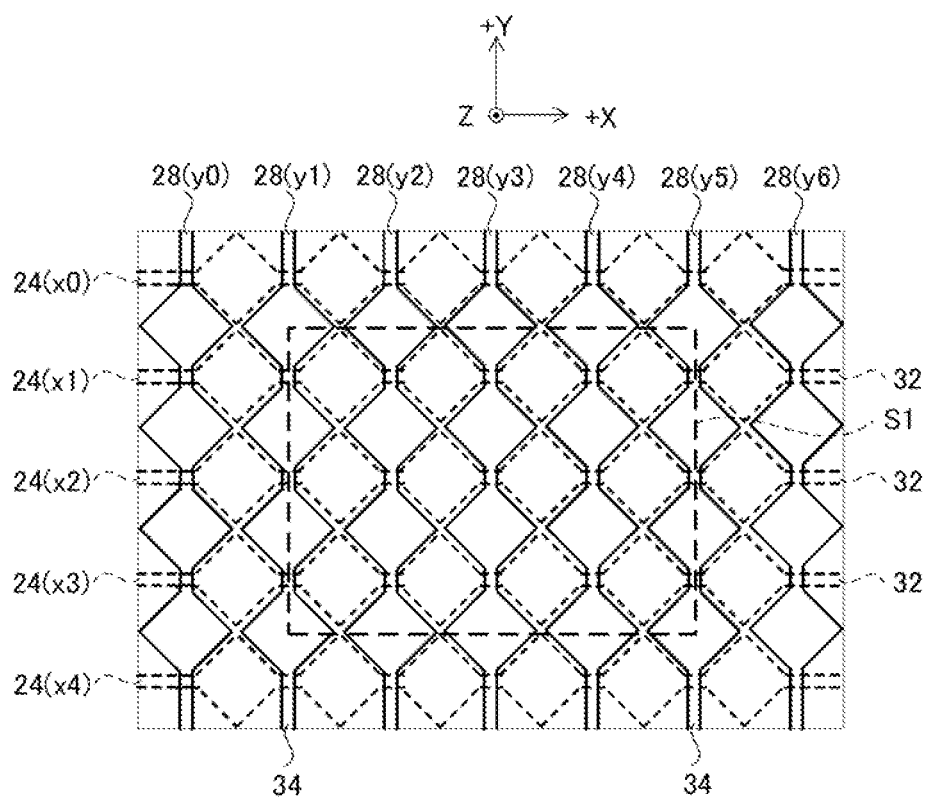
FIG. 14 is a drawing illustrating the first detection region, the first driving electrodes, and the first detection electrodes according to Embodiment 2.

Furthermore, after the non-contact receiver 64 receives the signals expressing the capacitances of the first electrodes 24(x1), 24(x3) selected as the first detection electrodes 34, as illustrated in FIG. 14, the selector 54 of the present embodiment selects, from among the second electrodes 28, the two second electrodes 28(y1), 28(y5) positioned on the outermost sides of the first detection region S1 as the first detection electrodes 34. The selector 54 of the present embodiment selects, as the first driving electrodes 32, the first electrodes 24(x1 to x3) that intersect, in the first detection region S1, the second electrodes 28(y1), 28(y5) selected as the first detection electrodes 34.

In accordance with the selection of the selector 54, the switcher 56 of the present embodiment connects the first electrodes 24(x1), 24(x3) selected as the first detection electrodes 34 to the non-contact receiver 64, and connects the second electrodes 28(y2 to y4) selected as the first driving electrodes 32 to the non-contact driver 62. Additionally, in accordance with the selection of the selector 54, the switcher 56 of the present embodiment connects the second electrodes 28(y1), 28(y5) selected as the first detection electrodes 34 to the non-contact receiver 64, and connects the first electrodes 24(x1 to x3) selected as the first driving electrodes 32 to the non-contact driver 62.

As with the non-contact driver 62 of Embodiment 1, the non-contact driver 62 of the present embodiment applies voltage to the first driving electrodes 32 connected by the switcher 56. Additionally, as with the non-contact receiver 64 of Embodiment 1, the non-contact receiver 64 of the present embodiment receives signals expressing the capacitances of the first detection electrodes 34 with respect to the voltage applied to the first driving electrodes 32.

In the present embodiment, the non-contact driver 62 applies voltage to the second electrodes 28(y2 to y4) selected as the first driving electrodes 32, and the non-contact receiver 64 receives the signals expressing the capacitances from the first electrodes 24(x1), 24(x3) selected as the first detection electrodes 34. Additionally, the non-contact driver 62 applies voltage to the first electrodes 24(x1 to x3) selected as the first driving electrodes 32, and the non-contact receiver 64 receives the signals expressing the capacitances from the second electrodes 28(y1), 28(y5) selected as the first detection electrodes 34.

The non-contact detector 66 of the present embodiment detects the movement of the target in the non-contacting state from changes over time in the signal strength of the signals expressing the capacitances of the first detection electrodes 34 (the first electrodes 24(x1), 24(x3)) received first by the non-contact receiver 64 and changes over time in the signal strength of the signals expressing the capacitances of the first detection electrodes 34 (the second electrodes 28(y1), 28(y5)) received second by the non-contact receiver 64. The non-contact detector 66 of the present embodiment outputs, to the controller of the electronic apparatus, device, or the like on which the detection device 10 is mounted, a signal expressing the detected movement of the target in the non-contacting state.

In the present embodiment, the movement of the target in the non-contacting state is detected from the signals expressing the capacitances of the first detection electrodes 34 that are sequentially selected and driven. As such, it is possible to prevent the detection of targets in the non-contacting state outside of the first detection region S1. Note that the determination of the movement of the target in the non-contacting state is the same as in Embodiment 1.

Figure 15:
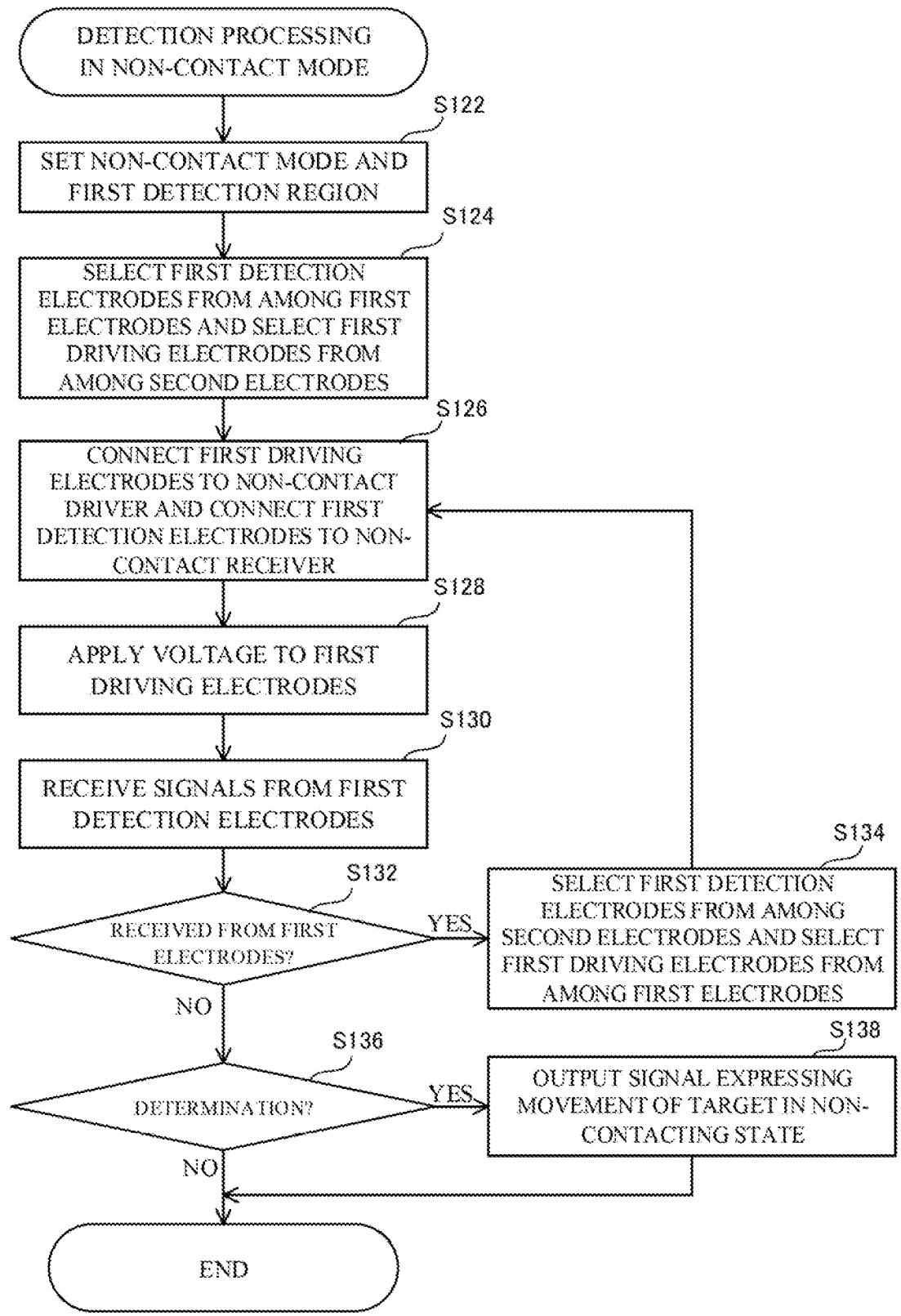
FIG. 15 is a flowchart illustrating detection processing in non-contact mode according to Embodiment 2.

Next, determination processing in non-contact mode (step S100) of the present embodiment is described while referencing FIG. 15. Here, a description is given of a case in which a display unit 200 including the detection device 10 and the display device 100 is mounted on an electronic apparatus. Firstly, the setter 52 sets the detection mode to the non-contact mode and further sets the first detection region 51 (step S122). Next, on the basis of the set first detection region 51, the selector 54 selects the first detection electrodes 34 from among the first electrodes 24 and selects the first driving electrodes 32 from among the second electrodes 28 (step S124). Specifically, the selector 54 selects, from among the first electrodes 24, the two first electrodes 24(x1, x3) positioned on the outermost sides of the set first detection region 51 as the first detection electrodes 34. Additionally, the selector 54 selects, from among the second electrodes 28, the second electrodes 28(y2 to y4) that intersect, in the first detection region 51, the first electrodes 24(x1, x3) selected as the first detection electrodes 34 as the first driving electrodes 32.

Next, the switcher 56 connects the selected first driving electrodes 32 to the non-contact driver 62, and connects the selected first detection electrodes 34 to the non-contact receiver 64 (step S126). Then, the non-contact driver 62 applies voltage to the first driving electrodes 32 (step S128), and the non-contact receiver 64 receives the signals expressing the capacitances of the first detection electrodes 34 (step S130).

In the present embodiment, when the signals expressing the capacitances are received from the first electrodes 24 after the signals expressing the capacitances of the first detection electrodes 34 are received (step S132; YES), the selector 54 selects the first detection electrodes 34 from among the second electrodes 28 and selects the first driving electrodes 32 from among the first electrodes 24 (step S134), and returns to step S126. The selector 54 selects, from among the second electrodes 28, the two second electrodes 28(y1, y5) positioned on the outermost sides of the first detection region 51 as the first detection electrodes 34. Additionally, the selector 54 selects, from among the first electrodes 24, the first electrodes 24(x1 to x3) that intersect, in the first detection region S1, the second electrodes 28(y1, y5) selected as the first detection electrodes 34 as the first driving electrodes 32.

When the signals expressing the capacitances are received from the second electrodes 28 after the signals expressing the capacitances of the first detection electrodes 34 are received (step S132; NO), the non-contact detector 66 determines the movement of the target in the non-contacting state from the changes over time in the signal strength of the signals expressing the capacitances of the first electrodes 24(x1), 24(x3) and the second electrodes 28(y1), 28(y5) (step S136). This determination is the same as in step S112 of Embodiment 1. When a determination is made that the changes over time in the signal strength express movement of the target in the non-contacting state, and movement of the target in the non-contacting state is detected (step S136; YES), the non-contact detector 66 outputs, to the controller of the electronic apparatus on which the display unit 200 (the detection device 10) is mounted and via the input/output device 51, a signal expressing the detected movement of the target in the non-contacting state (step S138). When the non-contact detector 66 outputs the signal expressing the movement of the target in the non-contacting state, the detection processing in non-contact mode (step S100) of the present embodiment is ended.

When a determination is not made that the changes over time in the signal strength express movement of the target in the non-contacting state, and movement of the target in the non-contacting state is not detected (step S136; NO), the detection processing in non-contact mode (step S100) of the present embodiment is ended.

As described above, in the present embodiment, the movement of the target in the non-contacting state is detected from the signals expressing the capacitances of the four first detection electrodes 34 that are sequentially driven two at a time. As such, it is possible to prevent the detection of targets in the non-contacting state outside of the first detection region S1. Additionally, as with Embodiment 1, in the present embodiment as well, the frame of the detection device 10 can be narrowed and the movement of the target in the non-contacting state can be detected with high sensitivity.

Embodiment 3

The detection device 10 of Embodiments 1 and 2 detects the target in the non-contacting state in the first detection region S1. A configuration is possible in which the detection device 10 sequentially changes the detection region and detects the target in the non-contacting state in each detection region.

In the present embodiment, the configuration of the controller 50 in the non-contact mode and the detection processing in non-contact mode differ from Embodiment 1. The controller 50 of the present embodiment sequentially changes predetermined detection region that detects the target in the non-contacting state, and detects the target in the non-contacting state in each region. The other configurations and processing of the detection device 10 are the same as with the detection device 10 of Embodiment 1.

As with the controller 50 of Embodiment 1, the controller 50 of the present embodiment includes the input/output device 51 to the storage 78. The configurations of the input/output device 51, the contact driver 72, the contact receiver 74, the contact detector 76, and the storage 78 are the same as in Embodiment 1.

Figure 16:
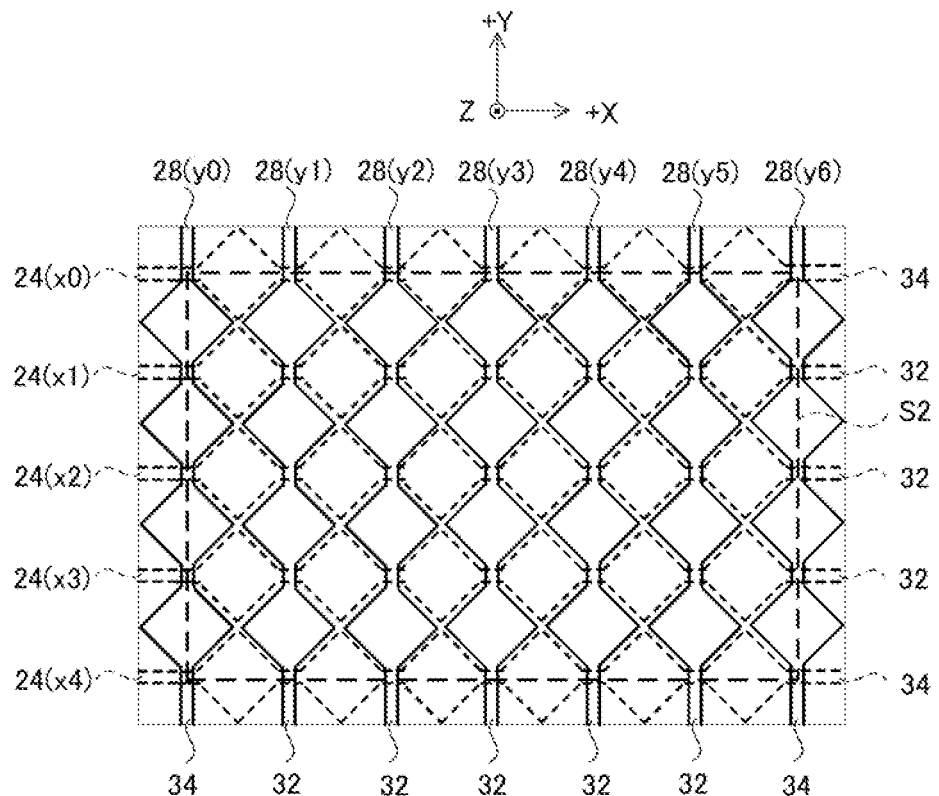
FIG. 16 is a plan view illustrating a second detection region according to Embodiment 3.
Figure 17:
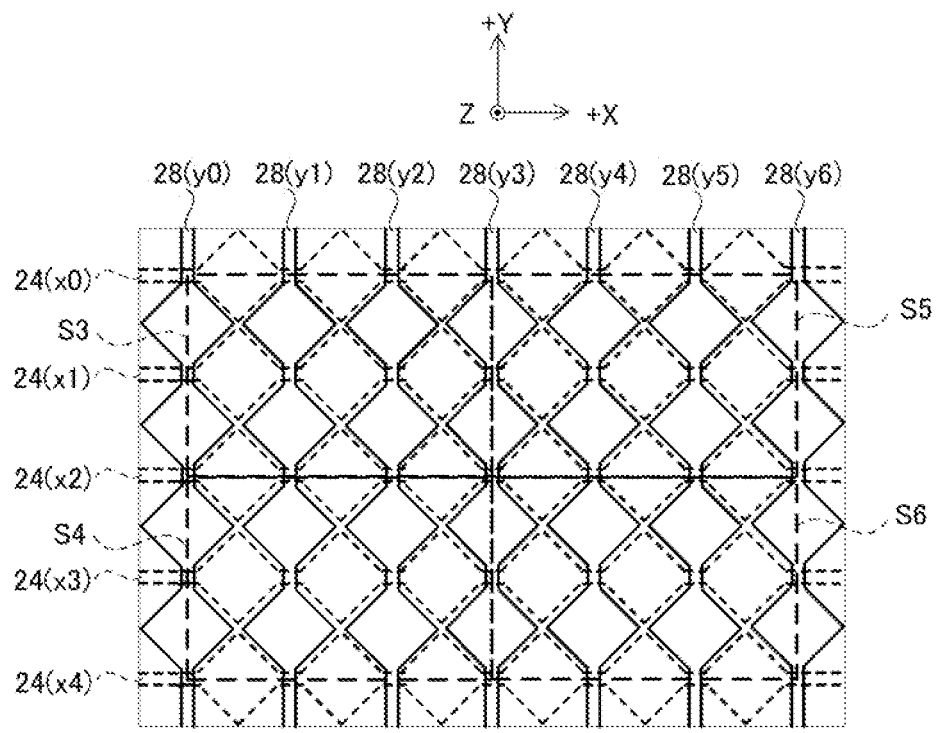
FIG. 17 is a plan view illustrating a third detection region to a sixth detection region according to Embodiment 3.

As with the setter 52 of Embodiment 1, the setter 52 of the present embodiment sets the detection mode to the non-contact mode. When the non-contact mode is set as the detection mode, the setter 52 of the present embodiment sets predetermined second to sixth detection regions S2 to S6 that detect the target in the non-contacting state. In the present embodiment, as illustrated in FIG. 16, the second detection region S2 is the largest region in which the detection device 10 can detect the target in the non-contacting state. Additionally, as illustrated in FIG. 17, each of the third detection region S3 to the sixth detection region S6 is a region obtained by quadrasecting the second detection region S2. When the target in the non-contacting state is detected in the second detection region S2, the setter 52 of the present embodiment sequentially changes the detection region that detects the target in the non-contacting state to the third to the sixth detection regions S3 to S6.

As with the selector 54 of Embodiment 1, the selector 54 of the present embodiment selects, as the first detection electrodes 34, two of the first electrodes 24 and two of the second electrodes 28 positioned on the outermost sides of each of the set second to sixth detection regions S2 to S6. Additionally, the selector 54 of the present embodiment selects the first driving electrodes 32 from among the first electrodes 24 and the second electrodes 28 that are not selected as the first detection electrodes 34. For example, when the setter 52 sets the second detection region S2, as illustrated in FIG. 16, the selector 54 of the present embodiment selects the two first electrodes 24($x$0), 24($x$4) and the two second electrodes 28($y$0), 28($y$6) as the first detection electrodes 34, and selects the first electrodes 24($x$1 to $x$3) and the second electrodes 28($y$1 to $y$5) as the first driving electrodes 32.

As with the switcher 56 of Embodiment 1, the switcher 56 of the present embodiment connects the first electrodes 24 and the second electrodes 28 selected as the first driving electrodes 32 to the non-contact driver 62. Additionally, the switcher 56 of the present embodiment connects the first electrodes 24 and the second electrodes 28 selected as the first detection electrodes 34 to the non-contact receiver 64.

As with the non-contact driver 62 of Embodiment 1, the non-contact driver 62 of the present embodiment applies voltage to the first driving electrodes 32 connected by the switcher 56. Additionally, as with the non-contact receiver 64 of Embodiment 1, the non-contact receiver 64 of the present embodiment receives signals expressing the capacitances of the first detection electrodes 34 with respect to the voltage applied to the first driving electrodes 32.

The non-contact detector 66 of the present embodiment detects the target in the non-contacting state from the changes over time in the signal strength of the signals expressing the capacitances of the first detection electrodes 34 received by the non-contact receiver 64. In the present embodiment, when the detection region that detects the target in the non-contacting state is the second detection region S2, the non-contact detector 66 of the present embodiment detects the presence/absence of the target in the non-contacting state. Additionally, when the detection region that detects the target in the non-contacting state is the third to the sixth detection regions S3 to S6, the non-contact detector 66 of the present embodiment detects the movement of the target in the non-contacting state.

Figure 18:
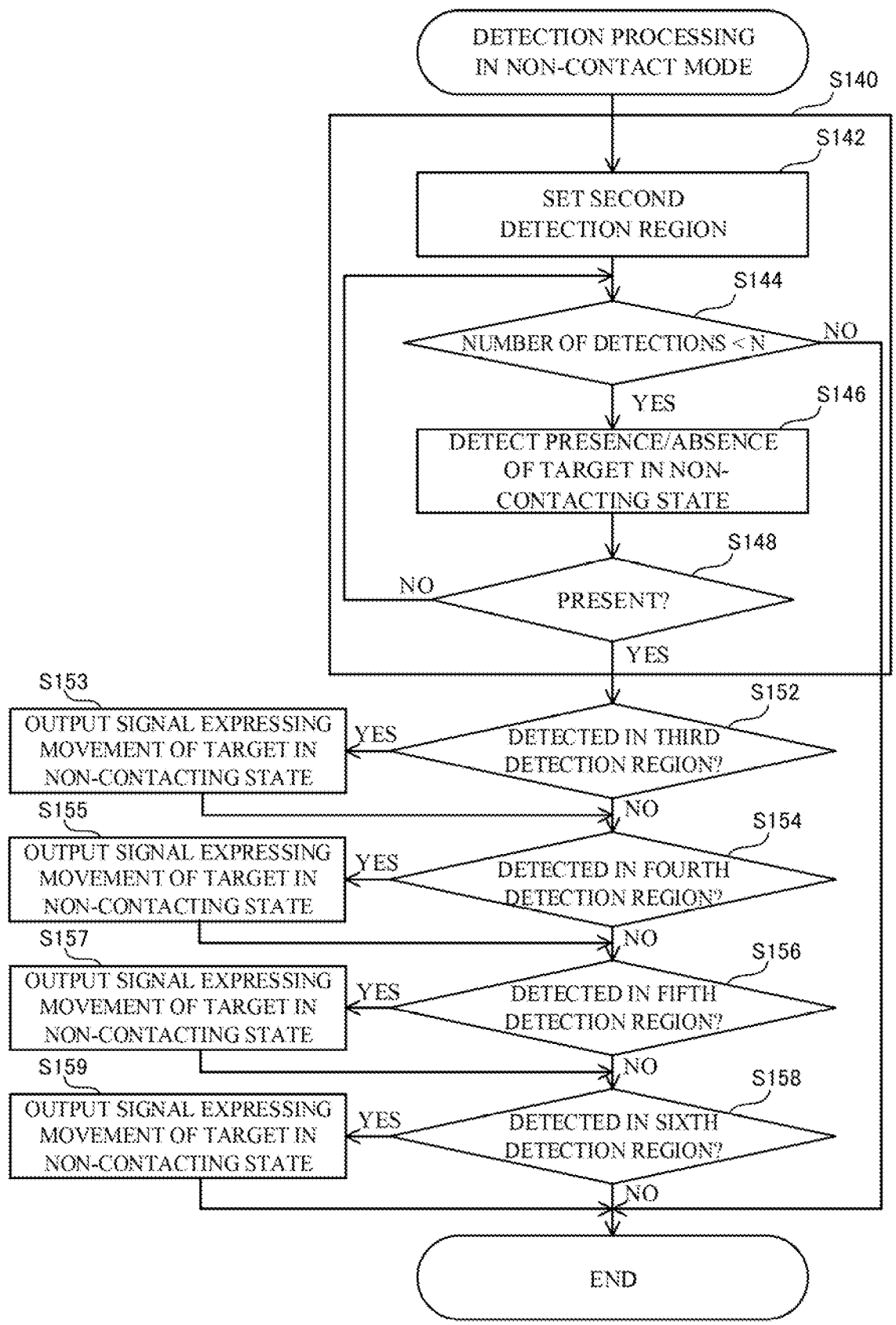
FIG. 18 is a flowchart illustrating detection processing in non-contact mode according to Embodiment 3.

Next, determination processing in non-contact mode (step S100) of the present embodiment is described while referencing FIG. 18. Here, a description is given of a case in which a display unit 200 including the detection device 10 and the display device 100 is mounted on an electronic apparatus. Firstly, the controller 50 detects the presence/absence of the target in the non-contacting state in the second detection region S2 (step S140).

In step S140, the setter 52 sets the detection mode to the non-contact mode, and further sets the second detection region S2. Additionally, the setter 52 sets a number of detections to 1 (step S142). In the present embodiment, the setter 52 counts the number of detections in the second detection region S2 and, when the number of detections is a predetermined number N (where N is a nonnegative number greater than 1) or greater (step S144; NO), ends the detection processing in non-contact mode (step S100).

When the number of detections is less than the predetermined count N (step S144; YES), the presence/absence of the target in the non-contacting state is detected (step S146). Specifically, the selector 54 selects the first detection electrodes 34 (the first electrodes 24($x$0, $x$4) and the second electrodes 28($y$0, $y$6)) and the first driving electrodes 32 (the first electrodes 24($x$1 to $x$3) and the second electrodes 28($y$1 to $y$5)). The switcher 56 connects the first driving electrodes 32 to the non-contact driver 62, and connects the first detection electrodes 34 to the non-contact receiver 64. The non-contact driver 62 applies voltage to the first driving electrodes 32, and the non-contact receiver 64 receives the signals expressing the capacitances of the first detection electrodes 34. The non-contact detector 66 determines and detects the presence/absence of the target in the non-contacting state from the changes over time in the signal strength of the signals expressing the capacitances received from the non-contact receiver 64. When there is no target in the non-contacting state (step S148; NO), the controller 50 returns to the determination of the number of detections (step S144).

When there is a target in the non-contacting state (step S148; YES), the controller 50 sequentially detects the movement of the target in the non-contacting state in the third to the sixth detection regions S3 to S6 and, when movement of the target in the non-contacting state is detected, outputs, to the controller of the electronic apparatus on which the display unit 200 (the detection device 10) is mounted, a signal expressing the detected movement of the target in the non-contacting state (steps S152 to S159). The detecting of the target in the non-contacting state in each of the third to sixth detection regions S3 to S6 and the outputting of the signal is the same as the detecting of the target in the non-contacting state (steps S102 to S112) and the outputting of the signal (step S114) of Embodiment 1. When the determination of the movement of the target in the non-contacting state in the sixth detection region (step S158; NO) or the outputting of the signal expressing the movement of the target (step S159) ends, the detection processing in non-contact mode (step S100) of the present embodiment is ended.

As described above, in the present embodiment, the target in the non-contacting state is detected in the second detection region S2 that is the largest region capable of detecting and, then, the target in the non-contacting state is detected in each of the third to sixth detection regions S3 to S6 obtained by dividing the second detection region S2. As such, the movement of the target in the non-contacting state can be detected with even higher sensitivity. Additionally, the target in the non-contacting state is sequentially detected in each of the third to sixth detection regions S3 to S6. As such, it is possible to detect a plurality of targets in the non-contacting state (for example, gestures of a plurality of users). Additionally, as with Embodiment 1, in the present embodiment as well, the frame of the detection device 10 can be narrowed.

Embodiment 4

In Embodiment 3, the detection device 10 sequentially changes the detection region and detects the target in the non-contacting state in each detection region. A configuration is possible in which the detection device 10 changes the detection region on the basis of the detected movement of the target in the non-contacting state, and detects the target in the non-contacting state in the changed detection region.

In the present embodiment, the configuration of the controller 50 and the detection processing in non-contact mode differ from Embodiment 1. After detecting the movement of the target in the non-contacting state of a predetermined detection region, the controller 50 of the present embodiment changes the predetermined detection region on the basis of the detected movement of the target in the non-contacting state, and detects the target in the non-contacting state of the changed predetermined detection region. The other configurations of the detection device 10 are the same as with the detection device 10 of Embodiment 1.

As with the controller 50 of Embodiment 1, the controller 50 of the present embodiment includes the input/output device 51 to the storage 78. The configurations of the input/output device 51, the contact driver 72, the contact receiver 74, the contact detector 76, and the storage 78 are the same as in Embodiment 1.

As with the setter 52 of Embodiment 1, the setter 52 of the present embodiment sequentially switches between the non-contact mode and the contact mode in time divisions, and sets the detection mode to the non-contact mode or the contact mode. When the non-contact mode is set as the detection mode, the setter 52 of the present embodiment sets a predetermined seventh detection region S7 that detects the target in the non-contacting state.

Figure 19:
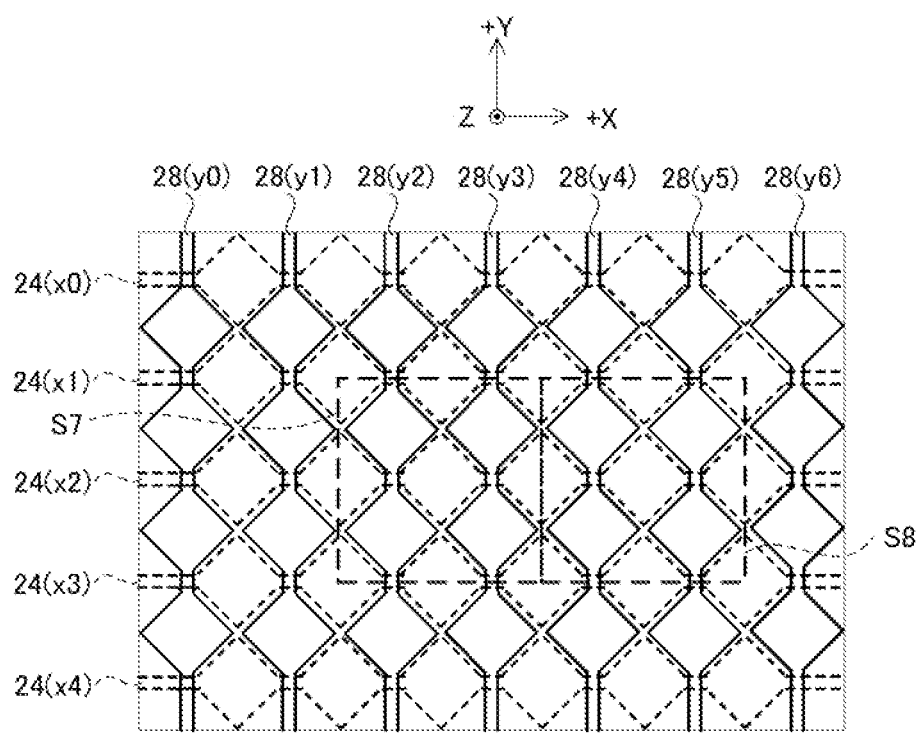
FIG. 19 is a plan view illustrating a seventh detection region and an eighth detection region according to Embodiment 4.

Additionally, the setter 52 of the present embodiment sets a predetermined eighth detection region S8 on the basis of the movement of the target in the non-contacting state detected in the seventh detection region S7, For example, when the non-contact detector 66 detects, in the seventh detection region S7, a flick gesture of the user from the −X direction to the +X direction, as illustrated in FIG. 19, the setter 52 of the present embodiment sets an eighth detection region S8 that is positioned more to the +X direction side than the seventh detection region S7.

The configurations of the selector 54, the switcher 56, the non-contact driver 62, and the non-contact receiver 64 of the present embodiment are the same as in Embodiment 1. As in Embodiment 1, the non-contact detector 66 of the present embodiment detects the movement of the target in the non-contacting state from the changes over time in the signal strength of the signals expressing the capacitances received by the non-contact receiver 64. Additionally, the non-contact detector 66 of the present embodiment outputs, to the setter 52 and the controller of the electronic apparatus, device, or the like on which the detection device 10 is mounted, a signal expressing the detected movement of the target in the non-contacting state.

Figure 20:
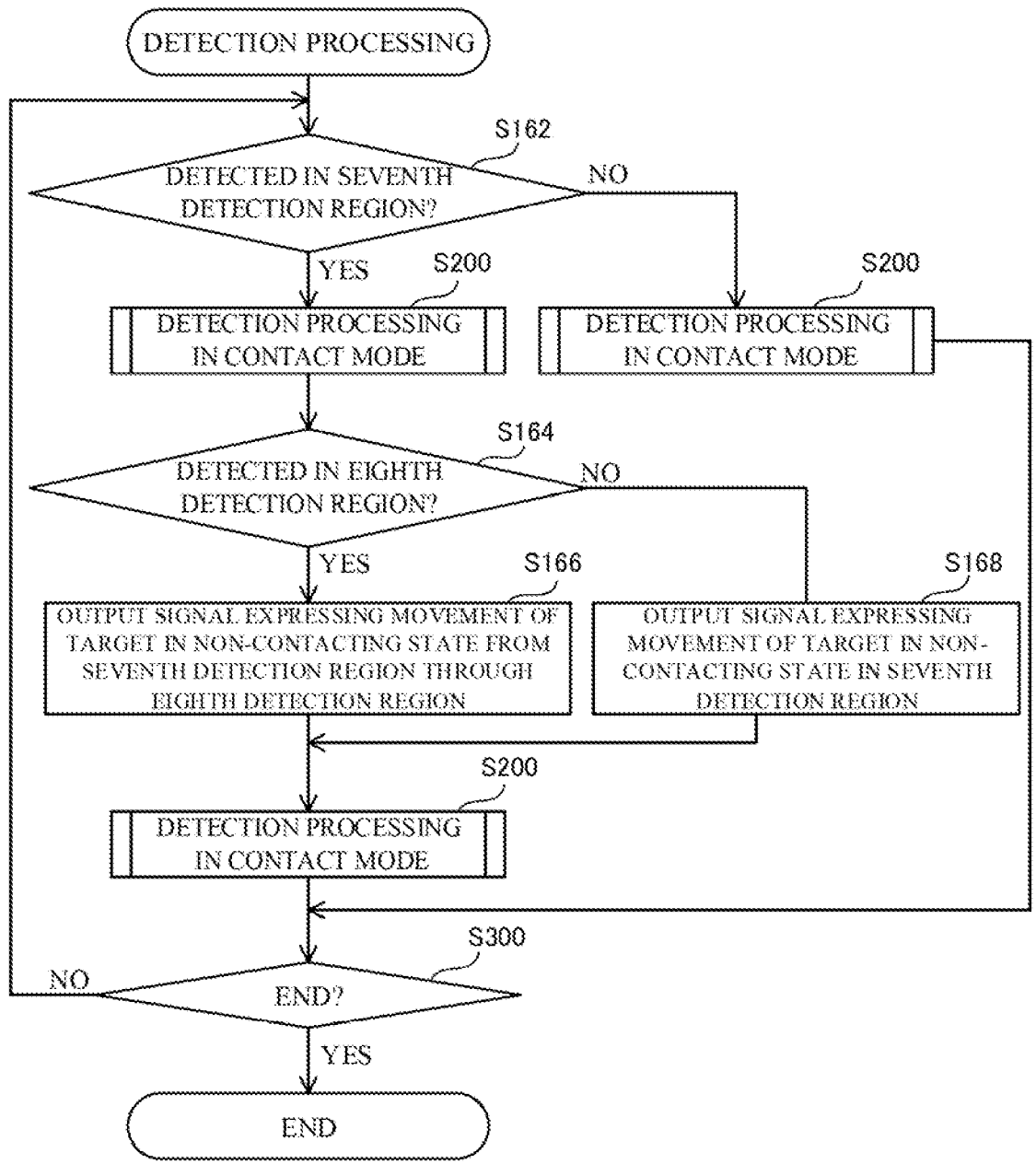
FIG. 20 is a flowchart illustrating detection processing according to Embodiment 4.

Next, detection processing of the present embodiment is described while referencing FIG. 20. A description is given of a case in which a display unit 200 including the detection device 10 and the display device 100 is mounted on an electronic apparatus.

In the detection processing of the present embodiment, firstly, detection of the target in the non-contacting state in the seventh detection region S7 is carried out (step S162) and, then, the detection processing in contact mode (step S200) is carried out. The detection of the target in the non-contacting state in the seventh detection region S7 is the same as the detection of the target in the non-contacting state of Embodiment 1 (steps S102 to S112).

When movement of the target in the non-contacting state is not detected in the detection of the target in the non-contacting state in the seventh detection region S7 (step S162; NO) and an end command is not input into the controller 50 (step S300; NO) after the detection processing in contact mode (step S200), the detection processing returns to the detection of the target in the non-contacting state in the seventh detection region S7 (step S162). When movement of the target in the non-contacting state is not detected in the detection of the target in the non-contacting state in the seventh detection region S7 (step S162; NO) and an end command is input into the controller 50 (step S300; YES) after the detection processing in contact mode (step S200), the detection processing is ended.

When movement of the target in the non-contacting state is detected in the detection of the target in the non-contacting state in the seventh detection region S7 (step S162; YES), the target in the non-contacting state is detected in the eighth detection region S8 (step S164) after the detection processing in contact mode (step S200). In such a case, the setter 52 sets the eighth detection region S8 on the basis of the movement of the target in the non-contacting state detected in the seventh detection region S7. The other processing is the same as the detection of the target in the non-contacting state of Embodiment 1 (steps S102 to S112).

When movement of the target in the non-contacting state is detected in the detection of the target in the non-contacting state in the eighth detection region S8 (step S164; YES), the non-contact detector 66 determines that the movement of the target in the non-contacting state is movement from the seventh detection region S7 and through the eighth detection region S8 (for example, a large flick gesture from the seventh detection region S7 and through the eighth detection region S8). Then, the non-contact detector 66 outputs, to the controller of the electronic apparatus on which the display unit 200 (the detection device 10) is mounted and via the input/output device 51, a signal expressing the detected movement of the target in the non-contacting state (step S166).

However, when movement of the target in the non-contacting state is not detected in the detection of the target in the non-contacting state in the eighth detection region S8 (step S164; NO), the non-contact detector 66 determines the movement of the target in the non-contacting state to be movement in the seventh detection region S7 (for example, a flick gesture in the seventh detection region S7). Then, the non-contact detector 66 outputs, to the controller of the electronic apparatus on which the display unit 200 (the detection device 10) is mounted and via the input/output device 51, a signal expressing the detected movement of the target in the non-contacting state (step S168).

After the signal expressing the detected movement of the target in the non-contacting state is outputted (steps S166, S168), the detection processing in contact mode is carried out (step S200). When, after the detection processing in contact mode (step S200), an end command is not input into the controller 50 (step S300; NO), the detection processing returns to the detection of the target in the non-contacting state in the seventh detection region S7 (step S162). When, after the detection processing in contact mode (step S200), an end command is input into the controller 50 (step S300; YES), the detection processing is ended.

As described above, in the present embodiment, the detection region is changed from the seventh detection region S7 to the eighth detection region S8 on the basis of the movement of the target in the non-contacting state detected in the seventh detection region S7, and the target in the non-contacting state of the changed eighth detection region S8 is detected. As such, larger movements of the target in the non-contacting state can be detected with high sensitivity. Additionally, as with Embodiment 1, in the present embodiment as well, the frame of the detection device 10 can be narrowed.

Embodiment 5

In Embodiment 1, the display unit 200 includes the detection device 10 and the display device 100 that displays two-dimensional text, images, and the like. A configuration is possible in which the display device 100 is implemented as a display device that displays a stereoscopic image (three-dimensional image).

Figure 21:
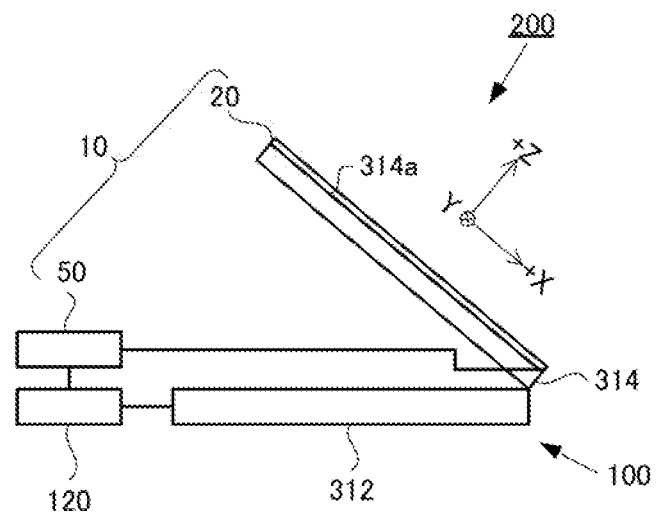
FIG. 21 is a schematic drawing illustrating a display unit according to Embodiment 5.

The display device 100 of the present embodiment displays a stereoscopic image as a floating image that is formed in space. As illustrated in FIG. 21, the display device 100 of the present embodiment includes an autostereoscopic display 312, a space image-forming element 314, and a display controller 120. The display controller 120 of the present embodiment controls the displaying of the autostereoscopic display 312.

The autostereoscopic display 312 is a display that projects different images to the left eye and the right eye of the user (observer) on the basis of a first input image and a second input image for two viewpoints. The autostereoscopic display 312 is implemented as a known lenticular lens type stereoscopic image display, a known parallax barrier type stereoscopic image display, or the like.

The space image-forming element 314 forms, in space, the stereoscopic image (the first input image and the second input image) projected by the autostereoscopic display 312 to form a floating image. In one example, the space image-forming element 314 is a flat plate-like image-forming element in which a plurality of light-reflecting elements (not illustrated in the drawings) having two reflective surfaces is arranged. The light-reflecting elements allow the light from an object to pass by reflecting the light from the target by a first reflective surface and a second reflective surface that are orthogonal to each other. The first reflective surface and the second reflective surface constitute a pair. The second reflective surface is disposed staggered from the first reflective surface, and intersects the first reflective surface. A known real mirror-image image-forming optical system (for example, Unexamined Japanese Patent Application Publication No. 2012-163702, Unexamined Japanese Patent Application Publication No. 2013-80227) can be used as the space image-forming element 314.

Figure 22:
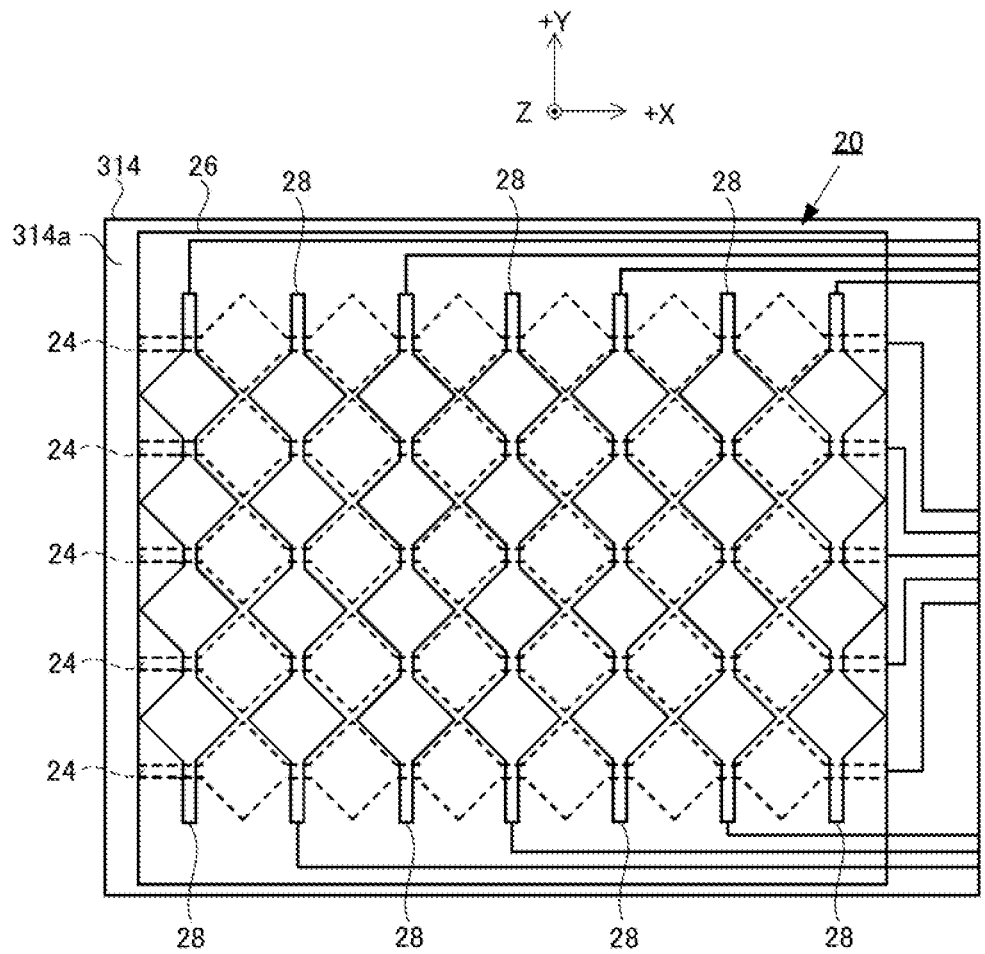
FIG. 22 is a plan view illustrating a sensor according to Embodiment 5.

In the present embodiment, as illustrated in FIGS. 21 and 22, the sensor 20 of the detection device 10 is provided on a surface 314a of the user side of the space image-forming element 314. Specifically, as illustrated in FIG. 22, the first electrodes 24 of the sensor 20 are each provided on the surface 314a of the space image-forming element 314. The insulating layer 26 of the sensor 20 is provided on the first electrodes 24, and insulates the first electrodes 24 and the second electrodes 28 from each other. Each of the second electrodes 28 of the sensor 20 are provided on the insulating layer 26. Additionally, a non-illustrated protective layer is provided on the second electrodes 28 of the sensor 20.

In the present embodiment, the controller 50 of the detection device 10 sets a detection region in accordance with the image-forming position of the floating image displayed by the display device 100 of the present embodiment, and detects the target in the non-contacting state in the set detection region. The configuration of the controller 50 and the detection of the target in the non-contacting state are the same as in Embodiment 1 or

Embodiment 2

As described above, the detection device 10 functions as an interface that receives user commands for the floating image (the stereoscopic image) displayed by the display device 100. Additionally, the detection device 10 sets the detection region in accordance with the image-forming position of the floating image and, as such, can detect user commands for the floating image with high sensitivity. Additionally, as with Embodiment 1, in the present embodiment as well, the frame of the detection device 10 can be narrowed.

Embodiment 6

In the display unit 200 of Embodiment 5, a configuration is possible in which the detection device 10 selects, in accordance with the depth of the floating image displayed by the display device 100, a third detection electrode from among the first electrodes or the second electrodes positioned outside of the detection region, and determines the position of the target in the non-contacting state in the depth direction of the floating image. In this case, the phrase, "the depth direction of the floating image" refers to the direction (the +Z direction) perpendicular to the detection region (the surface 314a of the space image-forming element 314) The configurations of the display device 100 and the sensor 20 of the detection device 10 of the present embodiment are the same as in Embodiment 5 and, as such, the controller 50 of the detection device 10 is described.

As with the controller 50 of Embodiment 1, the controller 50 of the present embodiment includes the input/output device 51 to the storage 78. The configurations of the input/output device 51, the contact driver 72, the contact receiver 74, the contact detector 76, and the storage 78 are the same as in Embodiment 1. Additionally, the configuration of the controller 50 in the contact mode and the detection processing in contact mode are the same as in Embodiment 1.

Figure 23:
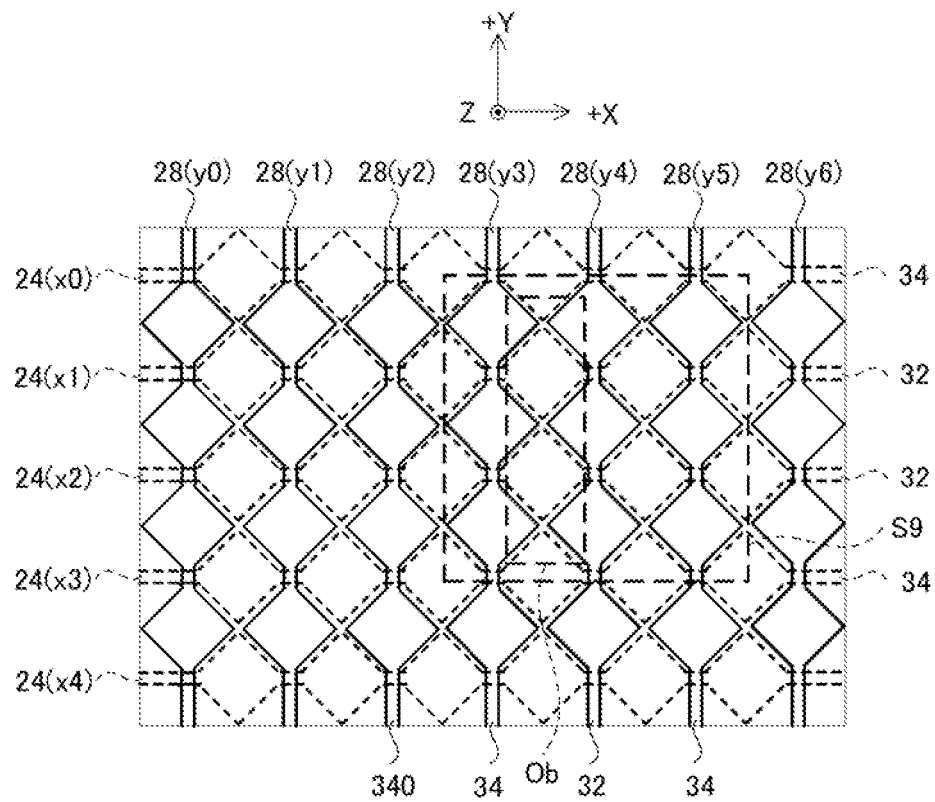
FIG. 23 is a plan view illustrating a floating image and a ninth detection region according to Embodiment 6.

When the non-contact mode is set as the detection mode, as illustrated in FIG. 23, the setter 52 of the present embodiment sets, to the sensor 20, a ninth detection region S9 in accordance with the image-forming position of a floating image Ob. Furthermore, when the depth of the floating image Ob is deep (that is, when the height in the +Z direction of the floating image Ob is great), the setter 52 of the present embodiment sets a third detection electrode 340 outside of the ninth detection region S9 in accordance with the depth of the floating image Ob.

As with the selector 54 of Embodiment 1, the selector 54 of the present embodiment selects, from among the first electrodes 24 and the second electrodes 28, the first driving electrodes 32 and the first detection electrodes 34 on the basis of the detection mode and the ninth detection region S9 set by the setter 52. As illustrated in FIG. 23, in the present embodiment, two of the first electrodes 24($x$0, x3) and two of the second electrodes 28($y$3, y5) positioned on the outermost sides in the ninth detection region S9 are selected as the first detection electrodes 34. Additionally, the first electrodes 24($x$1, x2) and the second electrode 28($y$4) are selected as the first driving electrodes 32. Furthermore, the selector 54 of the present embodiment selects, from among the first electrodes 24 and the second electrodes 28 positioned outside the ninth detection region S9, the third detection electrode 340 in accordance with the depth of the floating image Ob. In the present embodiment, the second electrode 28(y2) positioned outside the ninth detection region S9 is selected as the third detection electrode 340.

The switcher 56 of the present embodiment connects the first electrodes 24(x1, x2) and the second electrode 28(y4) selected as the first driving electrodes 32 to the non-contact driver 62. Additionally, the switcher 56 of the present embodiment connects the first electrodes 24(x0, x3) and the second electrodes 28(y3, y5) selected as the first detection electrodes 34 to the non-contact receiver 64. Furthermore, the switcher 56 of the present embodiment connects the second electrode 28(y2) selected as the third detection electrode 340 to the non-contact receiver 64.

The non-contact driver 62 of the present embodiment applies voltage to the first driving electrodes 32. Additionally, the non-contact receiver 64 of the present embodiment receives signals expressing the capacitances of the first detection electrodes 34 and a signal expressing the capacitance of the third detection electrode 340, with respect to the voltage applied to the first driving electrodes 32.

The non-contact detector 66 of the present embodiment determines and detects the position of the target in the non-contacting state in the depth direction of the floating image Ob and the movement of the target in the non-contacting state from changes over time in the signal strength of the signals expressing the capacitances of the first detection electrodes 34 and changes over time in the signal strength of the signal expressing the capacitance of the third detection electrode 340.

Figure 24:
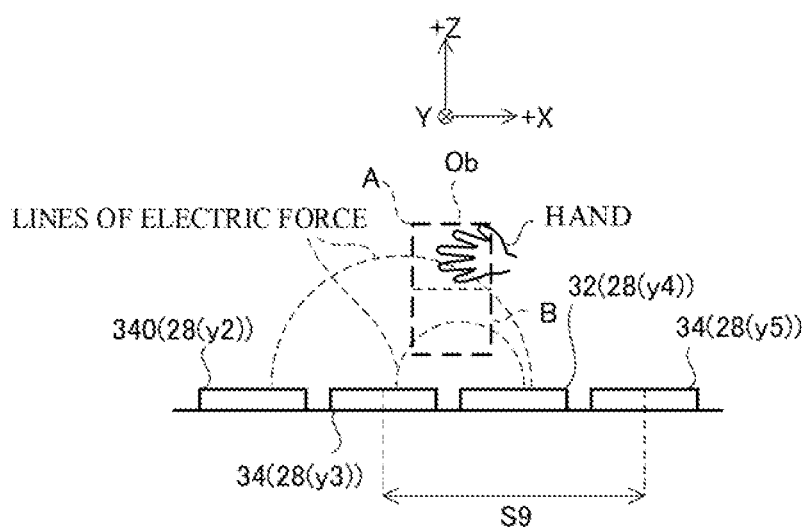
FIG. 24 is a schematic drawing illustrating lines of electric force according to Embodiment 6.
Figure 25:
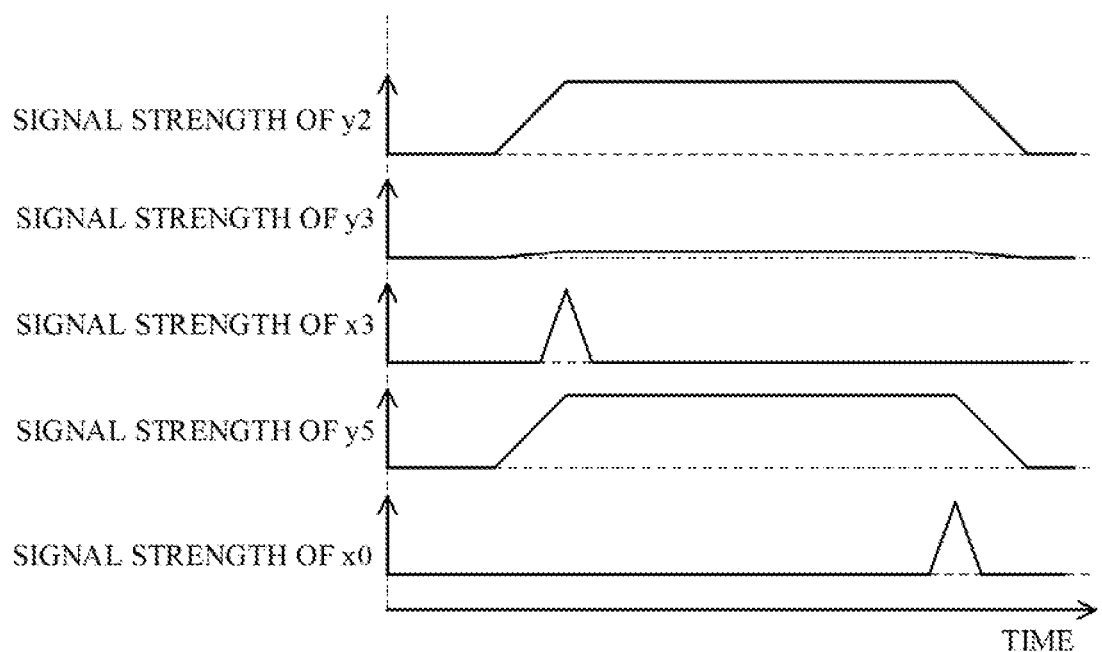
FIG. 25 is a drawing illustrating signals expressing capacitances of first detection electrodes and a third detection electrode according to Embodiment 6.

For example, when the hand of the user crosses, from the −Y direction to the +Y direction, a portion A of the floating image Ob where the depth is deep, as illustrated in FIG. 24, the hand of the user crosses a line of electric force between the first driving electrode 32 and the third detection electrode 340 (the second electrode 28(y2)) without crossing a line of electric force between the first driving electrode 32 and the first detection electrode 34 (the second electrode 28(y3)). Therefore, signals expressing capacitances such as illustrated in FIG. 25 are acquired. Specifically, during the period in which the hand of the user crosses, from the −Y direction to the +Y direction, the portion A where the depth is deep, signals having high strength are acquired from the second electrode 28(y2) and the second electrode 28(y5) that extend in the Y direction. Additionally, signals having high strength are acquired, in order, from the first electrode 24(x3) and the first electrode 24(x0) that extend in the X direction. The hand of the user does not cross a line of electric force between the first driving electrode 32 and the first detection electrode 34 (the second electrode 28(y3)) and, as such, a signal having high strength is not acquired from the second electrode 28(y3). The non-contact detector 66 determines and detects, from changes over time in these signal strengths, that the user performs a flick gesture from the −Y direction to the +Y direction in the portion A where the depth is deep.

Figure 26:
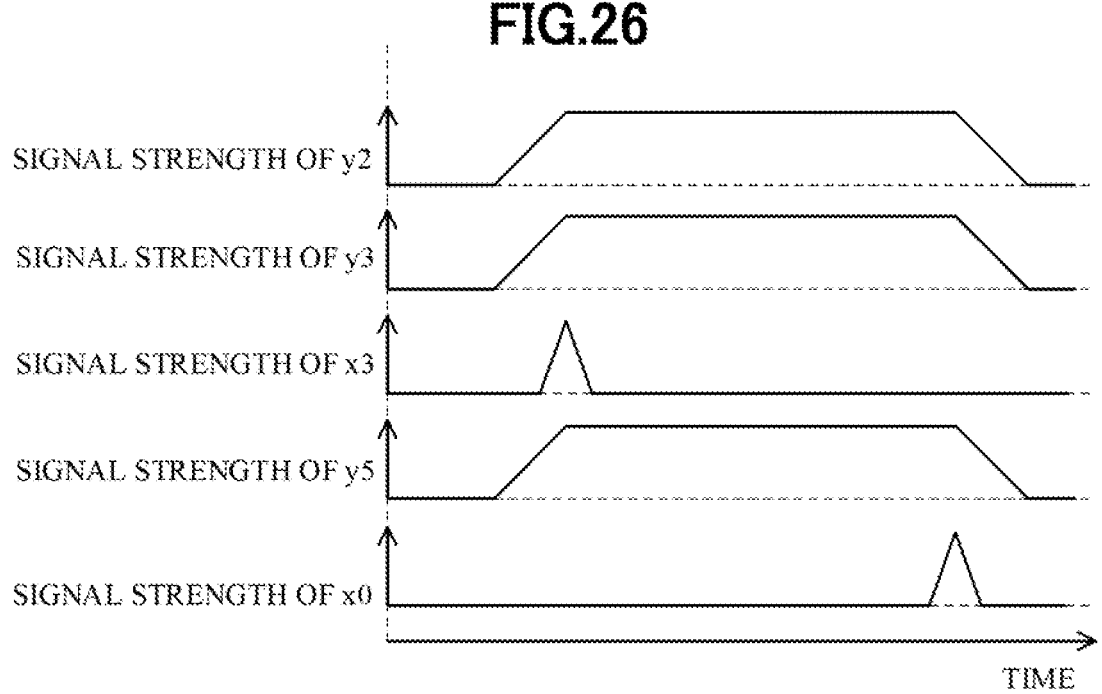
FIG. 26 is a drawing illustrating signals expressing capacitances of the first detection electrodes and the third detection electrode according to Embodiment 6.

However, when the hand of the user crosses, from the −Y direction to the +Y direction, a portion B of the floating image Ob where the depth is shallow, the hand of the user crosses the line of electric force between the first driving electrode 32 and the first detection electrode 34 (the second electrode 28(y3)) and a line of electric force between the first driving electrode 32 and the third detection electrode 340 (the second electrode 28(y2)). Therefore, as illustrated in FIG. 26, during the period in which the hand of the user crosses, from the −Y direction to the +Y direction, the portion B where the depth is shallow, signals having high strength are acquired from the second electrode 28(y2), the second electrode 28(y3), and the second electrode 28(y5). Additionally, signals having high strength are acquired, in order, from the first electrode 24(x3) and the first electrode 24(x0). The non-contact detector 66 determines and detects, from strength changes of these signals, that the user performs a flick gesture from the −Y direction to the +Y direction in the portion B where the depth is shallow. Note that, cases in which a signal having high strength is acquired from the second electrode 28(y3) but is not acquired from the second electrode 28(y2) are determined as misdetections.

Figure 27:
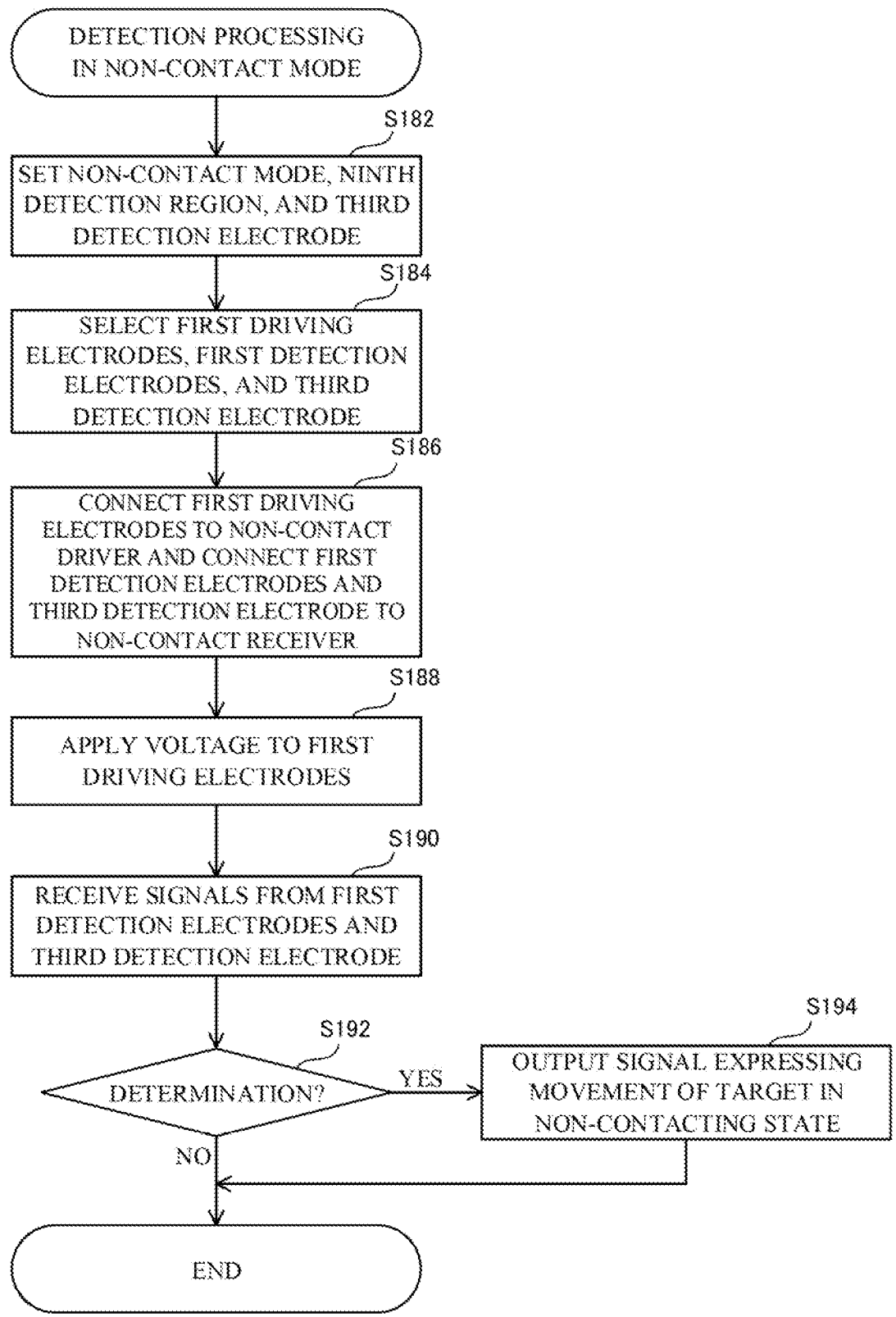
FIG. 27 is a flowchart illustrating detection processing in non-contact mode according to Embodiment 6.

Next, the determination processing in non-contact mode (step S100) of the present embodiment is described while referencing FIG. 27. A description is given of a case in which a display unit 200 is mounted on an electronic apparatus. Firstly, the setter 52 sets the detection mode to the non-contact mode. Additionally, the setter 52 sets the ninth detection region S9 in accordance with the image-forming position of the floating image Ob, and sets the third detection electrode 340 outside the ninth detection region S9 in accordance with the depth of the floating image Ob (step S182). Next, the selector 54 selects, from among the first electrodes 24 and the second electrodes 28, the first driving electrodes 32 and the first detection electrodes 34 on the basis of the set ninth detection region S9. Furthermore, the selector 54 selects the third detection electrode 340 from among the first electrodes 24 and the second electrodes 28 positioned outside the ninth detection region S9 (step S184).

Next, the switcher 56 connects the selected first driving electrodes 32 to the non-contact driver 62, and connects the selected first detection electrodes 34 and the third detection electrode 340 to the non-contact receiver 64 of the controller 50 (step S186). Then, the non-contact driver 62 applies voltage to the first driving electrodes 32 (step S188), and the non-contact receiver 64 receives the signals expressing the capacitances of the first detection electrodes 34 and the third detection electrode 340 (step S190). The signals expressing the capacitances received by the non-contact receiver 64 are stored in the storage 78.

The non-contact detector 66 of the controller 50 determines the movement (gesture of the user) of the target in the non-contacting state from the changes over time in the signal strength of the signals expressing the capacitances received by the non-contact receiver 64 (step S192). The determination is the same as in step S112 of Embodiment 1. When a determination is made that the changes over time in the signal strength expresses movement of the target in the non-contacting state, and movement of the target in the non-contacting state is detected (step S192; YES), the non-contact detector 66 outputs, to the controller of the electronic apparatus on which the display unit 200 (the detection device 10) is mounted and via the input/output device 51, a signal expressing the detected movement of the target in the non-contacting state (step S194). When the non-contact detector 66 outputs the signal expressing the movement of the target in the non-contacting state, the detection processing in non-contact mode (step S100) is ended.

When a determination is not made that the changes over time in the signal strength express movement of the target in the non-contacting state, and movement of the target in the non-contacting state is not detected (step S192; NO), the detection processing in the non-contact mode (step S100) is ended.

As described above, in the present embodiment, the third detection electrode 340 is selected from among the first electrodes 24 and the second electrodes 28 positioned outside the ninth detection region S9. As such, it is possible to determine the position of the target in the non-contacting state in the depth direction of the floating image, and detect the movement of the target in the non-contacting state. Additionally, as with Embodiment 1, in the present embodiment as well, the frame of the detection device 10 can be narrowed and the movement of the target in the non-contacting state can be detected with high sensitivity.

MODIFIED EXAMPLES

Embodiments have been described, but various modifications can be made to the present disclosure without departing from the spirit and scope of the present disclosure.

For example, in Embodiment 1, the detection device 10 detects contact by the target by mutual capacitance detection, but a configuration is possible in which the detection device 10 detects contact by the target by self-capacitance detection, or a combination of self-capacitance detection and mutual capacitance detection.

The detection device 10 of Embodiments 1 to 6 also functions as a touch panel. However, a configuration is possible in which the detection device 10 does not function as a touch panel.

In the detection of the target in the non-contacting state of the embodiments, it is preferable that the first electrodes 24 and the second electrodes 28 that are not selected as any of the first driving electrodes 32, the first detection electrodes 34, and the third detection electrode 340 are supplied with ground potential or are set as floating.

In Embodiment 4, the eighth detection region S8 is set in the direction (on the +X side) of the flick gesture detected in the seventh detection region S7, but a configuration is possible in which the eighth detection region S8 is set on the side opposite (on the −X side) of direction of the flick gesture. When the target in the non-contacting state is detected in the eighth detection region S8 set on the side opposite the direction of the flick gesture, the flick gesture detected in the seventh detection region S7 can be determined to be a misdetection, for example.

A configuration is possible in which movement of the target in the non-contacting state detected in the seventh detection region S7 and movement of the target in the non-contacting state detected in the eighth detection region S8 are output, individually, to the controller of the electronic apparatus on which the detection device 10 is mounted. Furthermore, a configuration is possible in which one movement of the target in the non-contacting state is determined from the movement of the target in the non-contacting state detected in the seventh detection region S7 and the movement of the target in the non-contacting state detected in the eighth detection region S8, and the detected one movement of the target in the non-contacting state is output to the controller of the electronic apparatus on which the detection device 10 is mounted.

In Embodiment 4, a configuration is possible in which the next detection region is set on the basis of the movement of the target in the non-contacting state detected in the eighth detection region S8, and the movement of the target in the non-contacting state is detected in the set detection region.

In Embodiment 2, a configuration is possible in which the detection processing in contact mode (step S200) is carried out after receiving the signals expressing the capacitances of the first electrodes 24 in step S132, and before transitioning to the processing for selecting the first detection electrodes 34 from among the second electrodes 28 and selecting the first driving electrodes 32 from among the first electrodes 24 in step S134.

In Embodiment 3, a configuration is possible in which, for example, the detection processing in contact mode (step S200) is carried out after the detection in the third detection region S3 (step S152) is performed and the signals expressing the movement of the target in the non-contacting state are outputted (step S153). Additionally, a configuration is possible in which the detection processing in contact mode (step S200) is carried out after outputting the signal expressing the movement of the target in the non-contacting state in each of the fourth to sixth detection regions S4 to S6 (steps S155, S157, S159).

Furthermore, in the detection processing described in the embodiments, as illustrated in FIG. 9, the detection processing in non-contact mode (step S100) is carried out one time and, then, the detection processing in contact mode (step S200) is carried out one time. Alternatively, a configuration is possible in which the detection processing in non-contact mode (step S100) and the detection processing in contact mode (step S200) are each carried out a plurality of times.

A configuration is possible in which, for example, the controller 50 includes dedicated hardware such as an application specific integrated circuit (ASIC), a field-programmable gate array (FPGA), or the like. In such a case, each of the processings may be executed by an individual piece of hardware. Additionally, the various processings may be grouped and executed by a single piece of hardware. Moreover, a portion of the processings may be executed by dedicated hardware, and another portion of the processings may be executed by software or firmware.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A detection device comprising:
   a plurality of first electrodes extending in a first direction;
   a plurality of second electrodes extending in a second direction that crosses the first direction; and
   a controller configured to (i) select, as first detection electrodes, two of the plurality of first electrodes and two of the plurality of second electrodes positioned outermost in a predetermined detection region, (ii) select, as first driving electrodes, at least one of the plurality of first electrodes and the plurality of second electrodes not selected as the first detection electrodes, and (iii) detect a target in a non-contacting state from signals expressing capacitances acquired, by applying a voltage to the first driving electrodes, from the first detection electrodes,
   wherein the controller is configured to perform an operation for detecting a movement of the target in the non-contacting state, the operation including:
   (i) selecting, as the first detection electrodes, two of the plurality of first electrodes positioned outermost in the predetermined detection region, (ii) selecting the first driving electrodes from among the plurality of second electrodes that intersect the first electrodes selected as the first detection electrodes in the predetermined detection region, and (iii) acquiring the signals from the two first detection electrodes that are the selected two first electrodes by applying a voltage to the first driving electrodes that are the selected second electrodes, and
- (i) selecting, as the first detection electrodes, two of the plurality of second electrodes positioned outermost in the predetermined detection region, (ii) selecting the first driving electrodes from among the plurality of first electrodes that intersect the second electrodes selected as the first detection electrodes in the predetermined detection region, and (iii) acquiring the signals from the two first detection electrodes that are the selected two second electrodes by applying a voltage to the first driving electrodes that are the selected first electrodes.

2. The detection device according to claim 1, wherein the controller is configured to detect the target in the non-contacting state from the signals acquired from at least three of the first detection electrodes.

3. The detection device according to claim 1, wherein the controller is configured to sequentially change the predetermined detection region, and detect the target in the non-contacting state in each of the changed predetermined detection regions.

4. The detection device according to claim 1, wherein the controller is configured to change the predetermined detection region based on detected movement of the target in the non-contacting state, and detect the target in the non-contacting state in the changed predetermined detection region.

5. The detection device according to claim 1, wherein the controller is configured to: (i) select one of the plurality of first electrodes and one of the plurality of second electrodes as second driving electrodes, (ii) select another of the plurality of first electrodes and another of the plurality of second electrodes as second detection electrodes, and (iii) detect a position that the target contacts from signals expressing a capacitance acquired, by applying a voltage to the second driving electrodes, from the second detection electrodes.

6. A display unit comprising:
the detection device according to claim 1; and
a display device.

7. A detection device comprising:
a plurality of first electrodes extending in a first direction;
a plurality of second electrodes extending in a second direction that crosses the first direction; and
a controller configured to (i) select, as first detection electrodes, two of the first electrodes and two of the second electrodes positioned outermost in a predetermined detection region, (ii) select, as first driving electrodes, at least one of the plurality of first electrodes and the plurality of second electrodes not selected as the first detection electrodes, and (iii) detect a target in a non-contacting state from signals expressing capacitances acquired, by applying a voltage to the first driving electrodes, from the first detection electrodes,
wherein the display device includes an autostereoscopic display configured to project, based on a first input image and a second input image for two viewpoints, different images to a left eye and a right eye of an observer that are aligned in a predetermined direction, and a space image-forming element that includes a plurality of light-reflecting elements that reflects light from an object by a first reflective surface and a second reflective surface that are orthogonal to each other and that forms, in space, a floating image corresponding to the first input image and the second input image projected by the autostereoscopic display, and
wherein the plurality of first electrodes and the plurality of second electrodes of the detection device are provided on the space image-forming element.

8. The display unit according to claim 7, wherein the controller is configured to change the predetermined detection region based on an image-forming position of the floating image.

9. The display unit according to claim 7, wherein the controller is configured to select, in accordance with a depth of the floating image, a third detection electrode from among the plurality of first electrodes and the plurality of second electrodes positioned outside the predetermined detection region, and determine a position of the target in the non-contacting state in a depth direction of the floating image from signals expressing capacitances acquired from the first detection electrodes and a signal expressing a capacitance acquired from the third detection electrode.

* * * * *